(12) United States Patent
Zhu

(10) Patent No.: US 11,668,900 B2
(45) Date of Patent: Jun. 6, 2023

(54) CAMERA OPTICAL LENS

(71) Applicant: AAC Optics (Changzhou) Co., Ltd., Changzhou (CN)

(72) Inventor: Feng Zhu, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 392 days.

(21) Appl. No.: 17/134,500

(22) Filed: Dec. 28, 2020

(65) Prior Publication Data

US 2021/0396966 A1    Dec. 23, 2021

(30) Foreign Application Priority Data

Jun. 23, 2020    (CN) .......................... 202010576762.1

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
None
See application file for complete search history.

(56) References Cited

U.S. PATENT DOCUMENTS

| | | | | |
|---|---|---|---|---|
| 8,810,921 B1* | 8/2014 | Tsai | ................... | G02B 13/0045 348/340 |
| 2014/0168794 A1* | 6/2014 | Tsai | ........................ | G02B 9/60 359/714 |
| 2015/0103244 A1* | 4/2015 | Lin | .................... | G02B 13/0045 348/376 |
| 2018/0129021 A1* | 5/2018 | Lin | ........................ | G02B 9/60 |
| 2021/0191076 A1* | 6/2021 | Lou | ........................ | G02B 13/18 |
| 2022/0019059 A1* | 1/2022 | Kamebuchi | ........ | G02B 13/0045 |

* cited by examiner

*Primary Examiner* — Darryl J Collins
(74) *Attorney, Agent, or Firm* — W&G Law Group

(57) ABSTRACT

A camera optical lens includes a first lens to a fifth lens. The camera optical lens satisfies $1.80 \leq f1/f \leq 3.50$; $1.25 \leq d7/d9 \leq 1.80$; $0.40 \leq f4/f \leq 0.90$; $3.50 \leq R9/R10 \leq 7.50$; and $1.00 \leq R3/R4 \leq 2.00$, where f denotes an total focal length of the camera optical lens, f1 denotes a focal length of the first lens, f4 denotes a focal length of a fourth lens, R3 denotes a curvature radius of an object side surface of a second lens, R4 denotes a curvature radius of an image side surface of the second lens, R9 denotes a curvature radius of an object side surface of the fifth lens, R10 denotes a curvature radius of an image side surface of the fifth lens, d7 denotes an on-axis thickness of the fourth lens, and d9 denotes an on-axis thickness of the fifth lens. The camera optical lens meets design requirements of a large aperture, a wide angle, and ultra-thinness while having good optical performance.

10 Claims, 12 Drawing Sheets

CAMERA OPTICAL LENS

TECHNICAL FIELD

The present disclosure relates to the field of optical lenses, and in particular, to a camera optical lens applicable to portable terminal devices such as smart phones and digital cameras, as well as camera devices such as monitors and PC lenses.

BACKGROUND

With the development of camera technologies, camera optical lenses are widely used in various electronic products, such as smart phones and digital cameras. For portability, people are increasingly pursuing the thinness of electronic products. Therefore, a miniaturized camera optical lens with better imaging quality has already become the mainstream in the current market.

In order to obtain better imaging quality, a traditional lens carried in a mobile phone camera usually adopts a three-lens structure or a four-lens structure. However, with the development of technologies and the increase in users' diversified demands, a five-lens structure gradually appears in lens design as the pixel area of the photosensitive devices is constantly reduced and the system's requirements on imaging quality is constantly increased. Although the common five-lens structure has good optical performance, its optical focal degree, lens spacing, and lens shape settings are still unreasonable to some extent. As a result, the lens structure cannot meet design requirements of a large aperture, a wide angle, and ultra-thinness while having good optical performance.

Therefore, it is necessary to provide a camera optical lens that has good optical performance and meets design requirements of a large aperture, a wide angle, and ultra-thinness.

SUMMARY

An objective of the present disclosure is to provide a camera optical lens, which is designed to solve the problem of insufficient large aperture, wide angle and ultra-thinness of the traditional camera optical lens.

The technical solution of the present disclosure is as follows. A camera optical lens includes from an object side to an image side: a first lens having positive refractive power; a second lens having positive refractive power; a third lens; a fourth lens having positive refractive power; and a fifth lens having negative refractive power, wherein the camera optical lens satisfies:

$1.80 \leq f1/f \leq 3.50$;

$1.25 \leq d7/d9 \leq 1.80$;

$0.40 \leq f4/f \leq 0.90$;

$3.50 \leq R9/R10 \leq 7.50$; and $1.00 \leq R3/R4 \leq 2.00$, where f denotes a total focal length of the camera optical lens, f1 denotes a focal length of the first lens, f4 denotes a focal length of the fourth lens, R3 denotes a curvature radius of an object side surface of the second lens, R4 denotes a curvature radius of an image side surface of the second lens, R9 denotes a curvature radius of an object side surface of the fifth lens, R10 denotes a curvature radius of an image side surface of the fifth lens, d7 denotes an on-axis thickness of the fourth lens, and d9 denotes an on-axis thickness of the fifth lens.

As an improvement, the camera optical lens satisfies:

$1.80 \leq d2/d4 \leq 3.00$, where d2 denotes an on-axis distance from an image side surface of the first lens to an object side surface of the second lens, and d4 denotes an on-axis distance from an image side surface of the second lens to an object side surface of the third lens.

As an improvement, the camera optical lens satisfies:

$-3.61 \leq (R1+R2)/(R1-R2) \leq -0.36$; and $0.05 \leq d1/TTL \leq 0.16$, where R1 denotes a curvature radius of an object side surface of the first lens, R2 denotes a curvature radius of an image side surface of the first lens, d1 denotes an on-axis thickness of the first lens, and TTL denotes a total optical length from the object side surface of the first lens to an image plane of the camera optical lens along an optic axis.

As an improvement, the camera optical lens satisfies:

$0.77 \leq f2/f \leq 48.42$;

$1.52 \leq (R3+R4)/(R3-R4) \leq 33.19$; and $0.03 \leq d3/TTL \leq 0.11$, where f2 denotes a focal length of the second lens, d3 denotes an on-axis thickness of the second lens, and TTL denotes a total optical length from an object side surface of the first lens to an image plane of the camera optical lens along an optic axis.

As an improvement, the camera optical lens satisfies:

$-15.19 \leq f3/f \leq 57.84$;

$-12.25 \leq (R5+R6)/(R5-R6) \leq 179.50$; and $0.04 \leq d5/TTL \leq 0.11$, where f3 denotes a focal length of the third lens, R5 denotes a curvature radius of an object side surface of the third lens, R6 denotes a curvature radius of an image side surface of the third lens, d5 denotes an on-axis thickness of the third lens, and TTL denotes a total optical length from an object side surface of the first lens to an image plane of the camera optical lens along an optic axis.

As an improvement, the camera optical lens satisfies:

$1.5 \leq (R7+R8)/(R7-R8) \leq 6.48$; and $0.09 \leq d7/TTL \leq 0.31$, where R7 denotes a curvature radius of an object side surface of the fourth lens, R8 denotes a curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens satisfies:

$-2.21 \leq f5/f \leq -0.32$;

$0.66 \leq (R9+R10)/(R9-R10) \leq 2.65$; and $0.06 \leq d9/TTL \leq 00.22$, where f5 denotes a focal length of the fifth lens,
d9 denotes an on-axis thickness of the fifth lens, and
TTL denotes a total optical length from an object side surface of the first lens to an image plane of the camera optical lens along an optic axis.

As an improvement, the camera optical lens satisfies: $TTL/IH \leq 1.45$, where IH denotes an image height of the camera optical lens, and TTL denotes a total optical length from an object side surface of the first lens to an image plane of the camera optical lens along an optic axis.

As an improvement, the camera optical lens satisfies: $FOV \geq 104.00°$, where FOV denotes a field of view of the camera optical lens.

As an improvement, the camera optical lens satisfies: $FNO \leq 2.46$, where FNO denotes an F number of the camera optical lens.

The present disclosure has the following beneficial effects:

The camera optical lens according to the present disclosure meets design requirements of a wide angle and ultra-thinness while having good optical performance, and is particularly applicable to mobile phone camera lens assemblies and WEB camera lenses composed of camera elements such as high pixel CCDs and CMOSs.

BRIEF DESCRIPTION OF DRAWINGS

In order to more clearly illustrate technical solutions in embodiments of the present disclosure, the accompanying drawings used in the embodiments are briefly introduced as follows. Apparently, the drawings described as follows are merely part of the embodiments of the present disclosure, and other drawings can also be acquired by those of ordinary skill in the art without paying creative efforts. In the drawings.

DESCRIPTION OF EMBODIMENTS

The present disclosure will be further described below with reference to the accompanying drawings and embodiments.

To make the objectives, technical solutions, and advantages of the present disclosure clearer, embodiments of the present disclosure will be described in detail as follows with reference to the accompanying drawings. However, those of ordinary skill in the art can understand that many technical details have been put forward in each embodiment of the present disclosure in order to make readers better understand the present disclosure. Even without these technical details and various changes and modifications based on the following embodiments, the technical solutions claimed in the present disclosure can also be implemented.

First Embodiment

Figure 1:
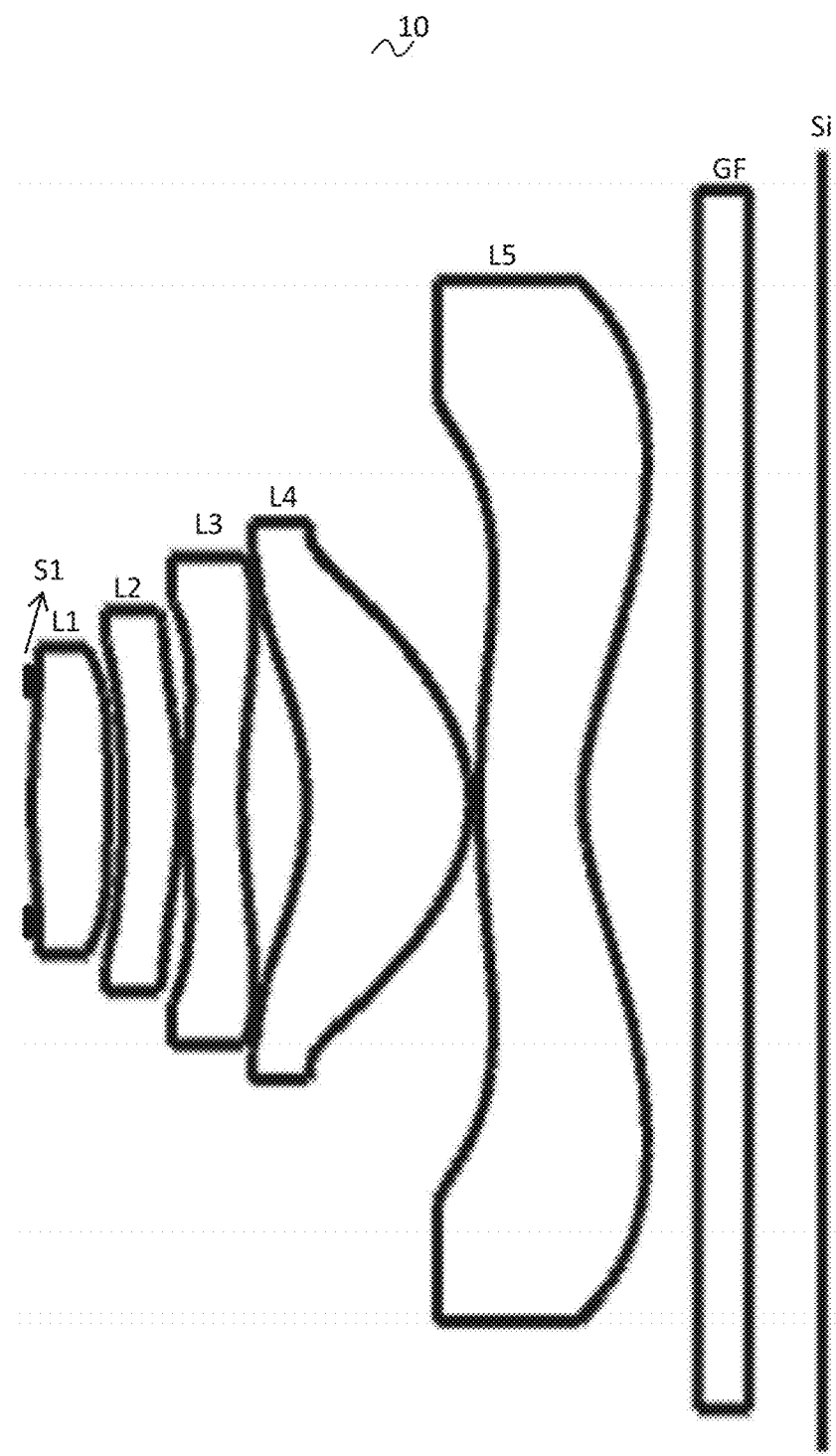
FIG. 1 is a schematic structural diagram of a camera optical lens according to a first embodiment of the present disclosure.

Referring to FIG. 1 to FIG. 4 together, a camera optical lens 10 is provided according to the first embodiment of the present disclosure. In FIG. 1, the left side is an object side, and the right side is an image side. The camera optical lens 10 mainly includes five lenses. The five lenses include successively from the object side to the image side, an aperture S1, a first lens L1, a second lens L2, a third lens L3, a fourth lens L4, and a fifth lens L5. A glass plate GF is provided between the fifth lens L5 and an image surface Si. The glass plate GF may be a glass cover plate or an optical filter.

In this embodiment, the first lens L1 has positive refractive power; the second lens L2 has positive refractive power; the third lens L3 has positive refractive power; the fourth lens L4 has positive refractive power; and the fifth lens L5 has negative refractive power.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material.

Herein, a total focal length of the camera optical lens 10 is defined as f, a focal length of the first lens L1 is f1, a focal length of the fourth lens L4 is f4, a curvature radius of an object side surface of the second lens L2 is R3, a curvature radius of an image side surface of the second lens L2 is R4, a curvature radius of an object side surface of the fifth lens L5 is R9, a curvature radius of an image side surface of the fifth lens L5 is R10, an on-axis thickness of the fourth lens L4 is d7, and an on-axis thickness of the fifth lens L5 is d9, which satisfy following relational expressions.

$1.80 \leq f1/f \leq 3.50$ (1)

$1.25 \leq d7/d9 \leq 1.80$ (2)

$0.40 \leq f4/f \leq 0.90$ (3)

$$3.50 \leq R9/R10 \leq 7.50 \quad (4)$$

$$1.00 \leq R3/R4 \leq 2.00 \quad (5)$$

The relational expression (1) specifies a ratio of the focal length f1 of the first lens L1 to the total focal length f of the camera optical lens 10. Within the range of the relational expression (1), it is conducive to improving performance of an optical system. In an embodiment, $1.83 \leq f1/f \leq 3.48$ is satisfied.

The relational expression (2) specifies a ratio of the on-axis thickness d7 of the fourth lens L4 to the on-axis thickness d9 of the fifth lens L5. Within the range of the relational expression (2), it is conducive to correcting system field curvature and improving the imaging quality.

The relational expression (3) specifies a ratio of the focal length f4 of the fourth lens L4 to the total focal length f of the camera optical lens 10. Within the range of the relational expression (3), the imaging quality can be improved.

The relational expression (4) specifies the shape of the fifth lens L5. Within the range of the relational expression (4), it is conducive to lens processing.

The relational expression (5) specifies the shape of the second lens L2. Within the range of the relational expression (5), a degree of deflection of light passing through the lens can be alleviated, thus effectively reducing the aberration.

An on-axis distance from an image side surface of the first lens L1 to an object-side surface of the second lens L2 is defined as d2, and an on-axis distance from an image side surface of the second lens L2 to an object-side surface of the third lens L3 is defined as d4, which satisfy a following relational expression: $1.80 \leq d2/d4 \leq 3.00$. Within the range of the relational expression, this can effectively reduce lens sensitivity and is conducive to lens assembly.

In this embodiment, the object side surface of the first lens L1 is a convex surface at a paraxial position, and the image side surface thereof is a concave surface at the paraxial position.

A curvature radius of an object side surface of the first lens L1 is R1, and a curvature radius of an image side surface of the first lens L1 is R2, which satisfy a following relational expression: $-3.61 \leq (R1+R2)/(R1-R2) \leq -0.36$. The shape of the first lens L1 is reasonably controlled, so that the first lens L1 can effectively correct spherical aberration of the system. In an embodiment, $-2.25 \leq (R1+R2)/(R1-R2) \leq -0.46$ is satisfied.

An on-axis thickness of the first lens L1 is d1, and a total optical length of the camera optical lens 10 is TTL, which satisfy a following relational expression: $0.05 \leq d1/TTL \leq 0.16$. Within the range of the relational expression, it is conducive to implementing ultra-thinness. In an embodiment, $0.07 \leq d1/TTL \leq 0.13$ is satisfied.

In this embodiment, the object side surface of the second lens L2 is a concave surface at a paraxial position, and the image side surface thereof is a convex surface at the paraxial position.

A total focal length of the camera optical lens 10 is f, and a focal length of the second lens L2 is defined as f2, which satisfy a following relational expression: $0.77 \leq f2/f \leq 48.42$. Positive refractive power of the second lens L2 is controlled within a reasonable range, so as to help correct aberration of the optical system. In an embodiment, $1.23 \leq f2/f \leq 38.74$ is satisfied.

A curvature radius of an object side surface of the second lens L2 is R3, and a curvature radius of an image side surface of the second lens L2 is R4, which satisfy a following relational expression: $1.52 \leq (R3+R4)/(R3-R4) \leq 33.19$. The relational expression specifies the shape of the second lens L2. Within this range, it is conducive to correcting the problem of axial chromatic aberration with the development of ultra-thin and wide-angle lenses. In an embodiment, $2.43 \leq (R3+R4)/(R3-R4) \leq 26.55$ is satisfied.

A total optical length of the camera optical lens 10 is TTL, and an on-axis thickness of the second lens L2 is defined as d3, which satisfy a following relational expression: $0.03 \leq d3/TTL \leq 0.11$. Within the range of the relational expression, it is conducive to implementation of ultra-thinness. In an embodiment, $0.05 \leq d3/TTL \leq 0.09$ is satisfied.

In this embodiment, the object side surface of the third lens L3 is a convex surface at a paraxial position, and the image side surface thereof is a concave surface at the paraxial position.

A total focal length of the camera optical lens 10 is f, and a focal length of the third lens L3 is defined as f3, which satisfy a following relational expression: $-15.19 \leq f3/f \leq 57.84$. By reasonably distributing the refractive power, the system is enabled to have better imaging quality and low sensitivity. In an embodiment, $-9.49 \leq f3/f \leq 46.27$ is satisfied.

A curvature radius of an object side surface of the third lens L3 is defined as R5, and a curvature radius of an image side surface of the third lens L3 is R6, which satisfy a following relational expression: $-12.25 \leq (R5+R6)/(R5-R6) \leq 179.50$. The shape of the third lens L3 can be effectively controlled, which is conducive to the formation of the third lens L3, and avoids poor formation and stress caused by excessive surface curvature of the third lens L3. In an embodiment, $-7.66 \leq (R5+R6)/(R5-R6) \leq 143.60$ is satisfied.

A total optical length of the camera optical lens 10 is TTL, and an on-axis thickness of the third lens L3 is defined as d5, which satisfy a following relational expression: $0.04 \leq d5/TTL \leq 0.11$. Within the range of the relational expression, it is conducive to implementation of ultra-thinness. In an embodiment, $0.06 \leq d5/TTL \leq 0.09$ is satisfied.

In this embodiment, the object side surface of the fourth lens L4 is a concave surface at a paraxial position, and the image side surface thereof is a convex surface at the paraxial position.

A curvature radius of an object side surface of the fourth lens L4 is defined as R7, and a curvature radius of an image side surface of the fourth lens L4 is R8, which satisfy a following relational expression: $1.15 \leq (R7+R8)/(R7-R8) \leq 6.48$. The relational expression specifies the shape of the fourth lens L4. Within this range, it is conducive to correcting the problems such as off-axis aberration with the development of ultra-thin and wide-angle lenses. In an embodiment, $1.84 \leq (R7+R8)/(R7-R8) \leq 5.19$ is satisfied.

A total optical length of the camera optical lens 10 is TTL, and an on-axis thickness of the fourth lens L4 is defined as d7, which satisfy a following relational expression: $0.09 \leq d7/TTL \leq 0.31$. Within the range of the relational expression, it is conducive to implementation of ultra-thinness. In an embodiment, $0.15 \leq d7/TTL \leq 0.25$ is satisfied.

In this embodiment, the object side surface of the fifth lens L5 is a convex surface at a paraxial position, and the image side surface thereof is a concave surface at the paraxial position.

A total focal length of the camera optical lens is f, and a focal length of the fifth lens L5 is defined as f5, which satisfy a following relational expression: $-2.21 \leq f5/f \leq -0.32$. The limitation on the fifth lens L5 can effectively flatten a light angle of the camera lens, and reduce the tolerance sensitivity. In an embodiment, $-1.38 \leq f5/f \leq -0.40$ is satisfied.

A curvature radius of an object side surface of the fifth lens L5 is R9, and a curvature radius of an image side surface of the fifth lens L5 is R10, which satisfy a following relational expression: $0.66 \leq (R9+R10)/(R9-R10) \leq 2.65$. The shape of the fifth lens L5 is specified. Within this range, it is conducive to correcting the problems such as off-axis aberration with the development of ultra-thin and wide-angle lenses. In an embodiment, $1.05 \leq (R9+R10)/(R9-R10) \leq 2.12$ is satisfied.

A total optical length of the camera optical lens 10 is TTL, and an on-axis thickness of the fifth lens L5 is defined as d9, which satisfy a following relational expression: $0.06 \leq d9/TTL \leq 0.22$. Within the range of the relational expression, it is conducive to implementation of ultra-thinness. In an embodiment, $0.09 \leq d9/TTL \leq 0.17$ is satisfied.

In this embodiment, an image height of the entire camera optical lens 10 is IH, which satisfies a following relational expression: $TTL/IH \leq 1.45$, thereby helping implement ultra-thinness.

In this embodiment, an F number FNO of the entire camera optical lens 10 satisfies a following relational expression: $FNO \leq 2.46$, thereby implementing a large aperture.

In this embodiment, a field of view FOV of the camera optical lens 10 is greater than or equal to 104.00°, thereby implementing a wide angle.

In this embodiment, a total focal length of the camera optical lens 10 is f, and a combined focal length of the first lens L1 and the second lens L2 is f12, which satisfy a following relational expression: $0.46 \leq f12/f \leq 4.81$. Within the range of the relational expression, aberration and distortion of the camera optical lens 10 can be eliminated, and a back focal length of the camera optical lens 10 can be suppressed, maintaining miniaturization of an image lens system group. In an embodiment, $0.73 \leq f12/f \leq 3.85$ is satisfied.

In addition, in the camera optical lens 10 provided in this embodiment, the surface of each lens can be set to an aspheric surface, the aspheric surface is easily made into a shape other than a spherical surface, and more control variables can be obtained to reduce aberration, thereby reducing the number of used lenses. Therefore, the total length of the camera optical lens 10 can be effectively reduced. In this embodiment, both the object side surface and the image side surface of each lens are aspheric surfaces.

It should be noted that the first lens L1, the second lens L2, the third lens L3, the fourth lens L4, and the fifth lens L5 have the same structure and parameter relations as above. Therefore, the camera optical lens 10 can reasonably allocate the refractive power, spacing, and shape of the lens, and various aberrations are corrected.

In this way, the camera optical lens 10 can meet design requirements of a large aperture, a wide angle, and ultra-thinness while having good optical imaging performance.

The camera optical lens 10 of the present disclosure will be described below with examples. Symbols listed in the examples are shown as below. The unit of the focal length, the on-axis distance, the curvature radius, the on-axis thickness, the inflection point position, and the arrest point position is mm.

TTL: total optical length (an on-axis distance from the object side surface of the first lens L1 to an image surface Si), in units of mm.

F number FNO: ratio of an effective focal length of the camera optical lens to an entrance pupil diameter.

In addition, at least one of the object side surface and the image side surface of each lens may also be provided with an inflection point and/or an arrest point to meet high-quality imaging requirements. For specific embodiment schemes, reference may be made to the following description.

Design data of the camera optical lens 10 shown in FIG. 1 is shown below.

Table 1 lists curvature radiuses R of the object side surface and image side surface of the first lens L1 to the fifth lens L5 constituting the camera optical lens 10 in the first embodiment of the present disclosure, the on-axis thickness of each lens, the distance d between two adjacent lenses, the refractive index nd, and the abbe number vd. It should be noted that R and d are both in units of millimeter (mm).

TABLE 1

|  | R |  | d | nd |  | vd |  |
|---|---|---|---|---|---|---|---|
| S1 | ∞ | d0= | −0.009 |  |  |  |  |
| R1 | 2.285 | d1= | 0.312 | nd1 | 1.5444 | v1 | 55.82 |
| R2 | 239.484 | d2= | 0.062 |  |  |  |  |
| R3 | −2.905 | d3= | 0.234 | nd2 | 1.5444 | v2 | 55.82 |
| R4 | −1.919 | d4= | 0.027 |  |  |  |  |
| R5 | 1.810 | d5= | 0.231 | nd3 | 1.6700 | v3 | 19.39 |
| R6 | 1.780 | d6= | 0.263 |  |  |  |  |
| R7 | −1.008 | d7= | 0.675 | nd4 | 1.5346 | v4 | 55.69 |
| R8 | −0.445 | d8= | 0.040 |  |  |  |  |
| R9 | 3.346 | d9= | 0.422 | nd5 | 1.6700 | v5 | 19.39 |
| R10 | 0.625 | d10= | 0.478 |  |  |  |  |
| R11 | ∞ | d11= | 0.210 | ndg | 1.5168 | vg | 64.17 |
| R12 | ∞ | d12= | 0.301 |  |  |  |  |

Meanings of the symbols in the above table are as follows.

S1: aperture;

R: curvature radius at the center of the optical surface;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the optical filter GF;

R12: curvature radius of the image side surface of the optical filter GF;

d: on-axis thickness of the lens and on-axis distance between the lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to the image surface Si;
nd: refractive index of the d-line;
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;
ndg: refractive index of the d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5; and
vg: abbe number of the optical filter GF.

Table 2 shows aspheric data of respective lenses in the camera optical lens 10 according to the first embodiment of the present disclosure.

For convenience, the aspheric surface of each lens surface uses the aspheric surface shown in the above formula (6). However, the present disclosure is not limited to the aspheric polynomial form represented by the formula (6).

Table 3 and Table 4 show design data of inflection points and arrest points of respective lenses in the camera optical lens 10 according to this embodiment. P1R1 and P1R2 represent the object side surface and the image side surface of the first lens L 1, respectively. P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 represent the object side surface and the image side surface of the fifth lens L5, respectively. Data corresponding to the "reflection point position" column is a vertical distance from the inflection point disposed on the surface of each lens to the optic axis of the camera optical lens 10. Data corresponding to the "arrest point position" column is a vertical distance from the arrest point disposed on the surface of each lens to the optic axis of the camera optical lens 10.

TABLE 2

| | Conic coefficient | Aspheric coefficient | | | | |
|---|---|---|---|---|---|---|
| | k | A4 | A6 | A8 | A10 | A12 |
| R1 | −8.6958E+00 | −1.4472E−01 | 2.7046E+00 | −2.6450E+02 | 8.2300E+03 | −1.4048E+05 |
| R2 | −9.6445E+01 | −1.2255E+00 | 3.1872E+01 | −8.9605E+02 | 1.3257E+04 | −1.1731E+05 |
| R3 | −9.9003E+01 | −8.1250E−01 | 2.8068E+01 | −7.2729E+02 | 1.0541E+04 | −9.1729E+04 |
| R4 | −9.8123E+00 | −1.9175E+00 | 3.3271E+01 | −3.4941E+02 | 2.4987E+03 | −1.1960E+04 |
| R5 | −4.3625E+01 | −1.8457E+00 | 2.8226E+01 | −3.1774E+02 | 2.2374E+03 | −1.0372E+04 |
| R6 | −7.4883E−02 | −7.6556E−01 | 3.0951E+00 | −1.1459E+01 | 6.3669E+00 | 1.0380E+02 |
| R7 | −1.1051E−01 | 7.8394E−02 | −7.7318E−01 | 1.7435E+01 | −8.6905E+01 | 2.4092E+02 |
| R8 | −2.9286E+00 | −7.8331E−01 | 1.4300E+00 | −3.5137E+00 | 8.8705E+00 | −2.5036E+01 |
| R9 | −5.0999E+01 | 2.5753E−01 | −9.9923E−01 | 1.6503E+00 | −1.9495E+00 | 1.7171E+00 |
| R10 | −7.3585E+00 | 1.2879E−02 | −2.1147E−01 | 2.5989E−01 | −1.8237E−01 | 8.6120E−02 |
| | Conic coefficient | Aspheric coefficient | | | | |
| | k | A14 | A16 | A18 | A20 | |
| R1 | −8.6958E+00 | 1.3934E+06 | −7.9943E+06 | 2.4591E+07 | −3.1375E+07 | |
| R2 | −9.6445E+01 | 6.3236E+05 | −2.0235E+06 | 3.5120E+06 | −2.5289E+06 | |
| R3 | −9.9003E+01 | 4.8649E+05 | −1.5345E+06 | 2.6385E+06 | −1.8994E+06 | |
| R4 | −9.8123E+00 | 3.8283E+04 | −7.9272E+04 | 9.5629E+04 | −5.0591E+04 | |
| R5 | −4.3625E+01 | 3.1590E+04 | −6.0451E+04 | 6.5461E+04 | −3.0437E+04 | |
| R6 | −7.4883E−02 | −3.9591E+02 | 6.6635E+02 | −5.6055E+02 | 1.9124E+02 | |
| R7 | −1.1051E−01 | −4.0938E+02 | 4.2511E+02 | −2.4912E+02 | 6.3090E+01 | |
| R8 | −2.9286E+00 | 6.0425E+01 | −9.1192E+01 | 7.3400E+01 | −2.3768E+01 | |
| R9 | −5.0999E+01 | −1.0679E+00 | 4.2072E−01 | −9.0818E−02 | 8.0163E−03 | |
| R10 | −7.3585E+00 | −2.9303E−02 | 6.9810E−03 | −1.0253E−03 | 6.8226E−05 | |

In Table 2, k is the conic coefficient, and A4, A6, A8, A10, A12, A14, A16, A18, and A20 are aspheric coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (6)$$

x is a vertical distance between a point on an aspheric curve and the optic axis, and y is an aspheric depth (a vertical distance between a point on an aspheric surface at a distance of x from the optic axis and a tangent plane tangent to a vertex on an aspheric optic axis).

TABLE 3

| | Number of reflection points | Reflection point position 1 | Reflection point position 2 | Reflection point position 3 | Reflection point position 4 |
|---|---|---|---|---|---|
| P1R1 | 1 | 0.295 | / | / | / |
| P1R2 | 2 | 0.025 | 0.505 | / | / |
| P2R1 | 2 | 0.515 | 0.555 | / | / |
| P2R2 | 4 | 0.365 | 0.535 | 0.595 | 0.615 |

TABLE 3-continued

| | Number of reflection points | Reflection point position 1 | Reflection point position 2 | Reflection point position 3 | Reflection point position 4 |
|---|---|---|---|---|---|
| P3R1 | 1 | 0.215 | / | / | / |
| P3R2 | 2 | 0.355 | 0.845 | / | / |
| P4R1 | 2 | 0.495 | 0.795 | / | / |
| P4R2 | 2 | 0.775 | 0.955 | / | / |
| P5R1 | 3 | 0.475 | 1.295 | 1.455 | / |
| P5R2 | 2 | 0.485 | 1.815 | / | / |

TABLE 4

| | Number of arrest points | Arrest point position 1 |
|---|---|---|
| P1R1 | 1 | 0.425 |
| P1R2 | 1 | 0.025 |
| P2R1 | 0 | / |
| P2R2 | 0 | / |
| P3R1 | 1 | 0.385 |
| P3R2 | 1 | 0.645 |
| P4R1 | 0 | / |
| P4R2 | 0 | / |
| P5R1 | 1 | 0.785 |
| P5R2 | 1 | 1.205 |

In addition, Table 17 below also lists values corresponding to various parameters in the first, second, third, and fourth embodiments and parameters specified in the relational expressions.

As shown in Table 17, the camera optical lens of the first embodiment satisfies the relational expressions.

Figure 2:
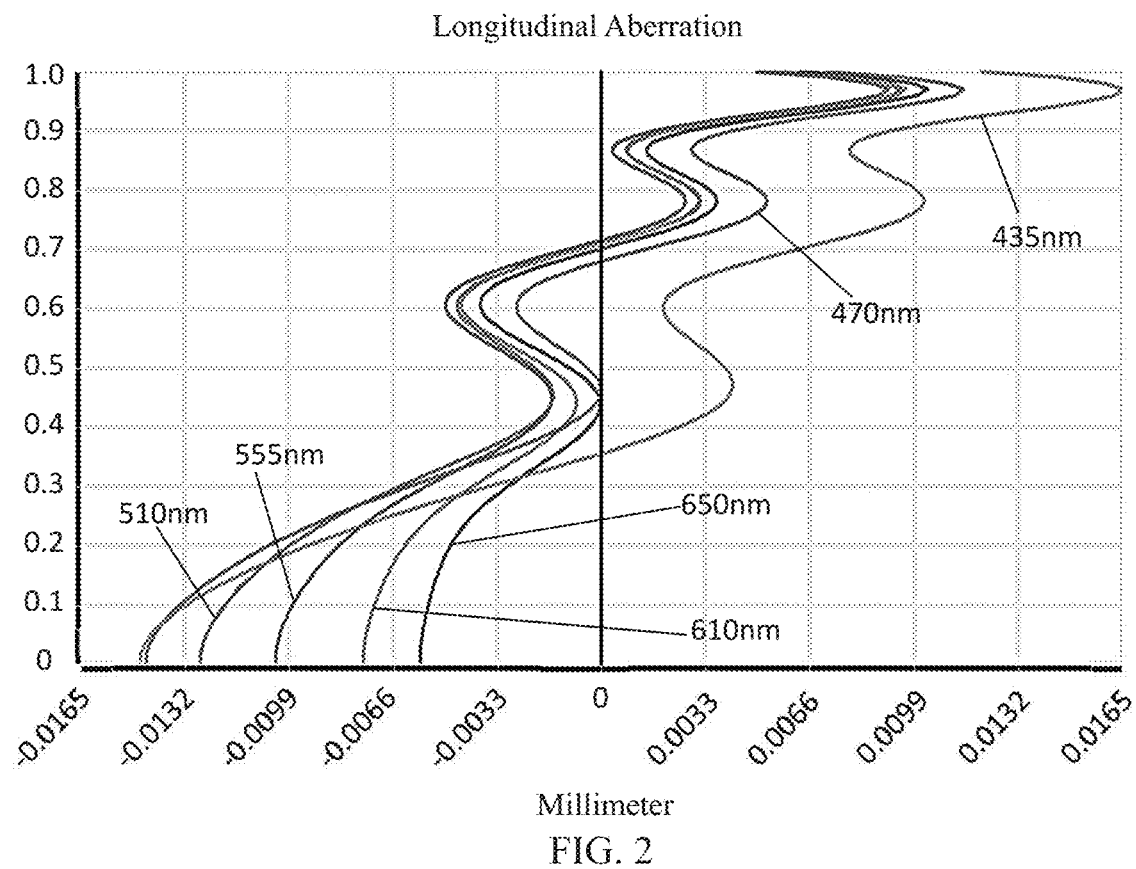
FIG. 2 is a schematic diagram of a longitudinal aberration of the camera optical lens shown in FIG. 1.
Figure 3:
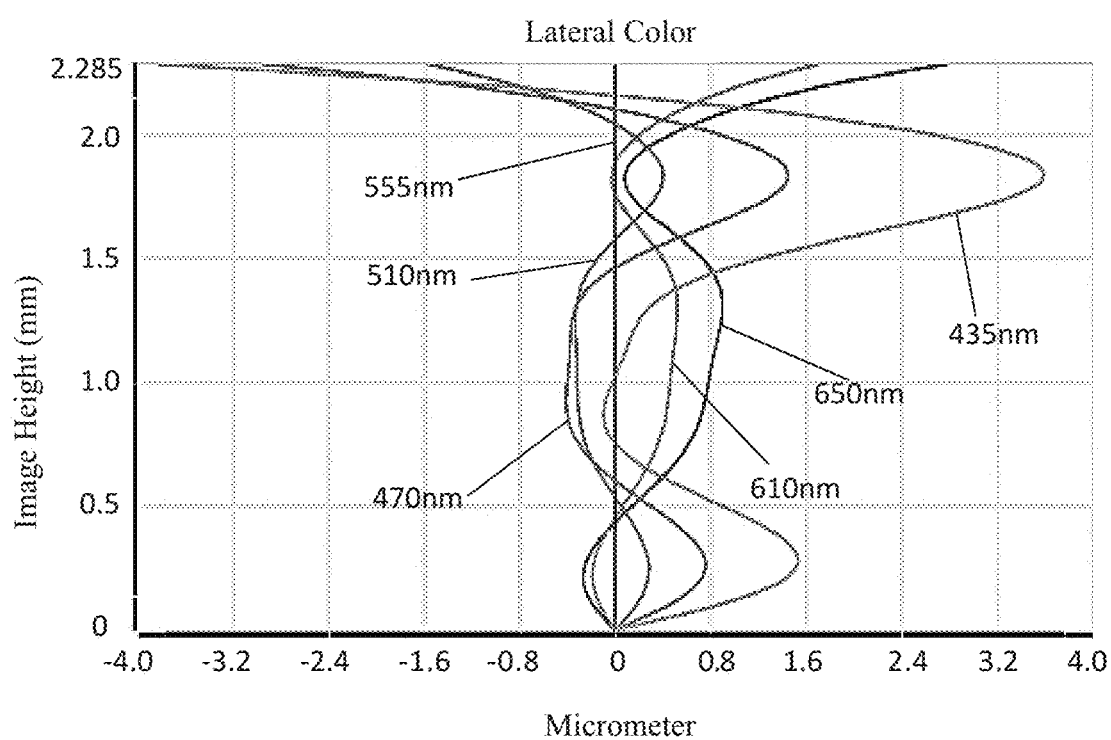
FIG. 3 is a schematic diagram of a lateral color of the camera optical lens shown in FIG. 1.
Figure 4:
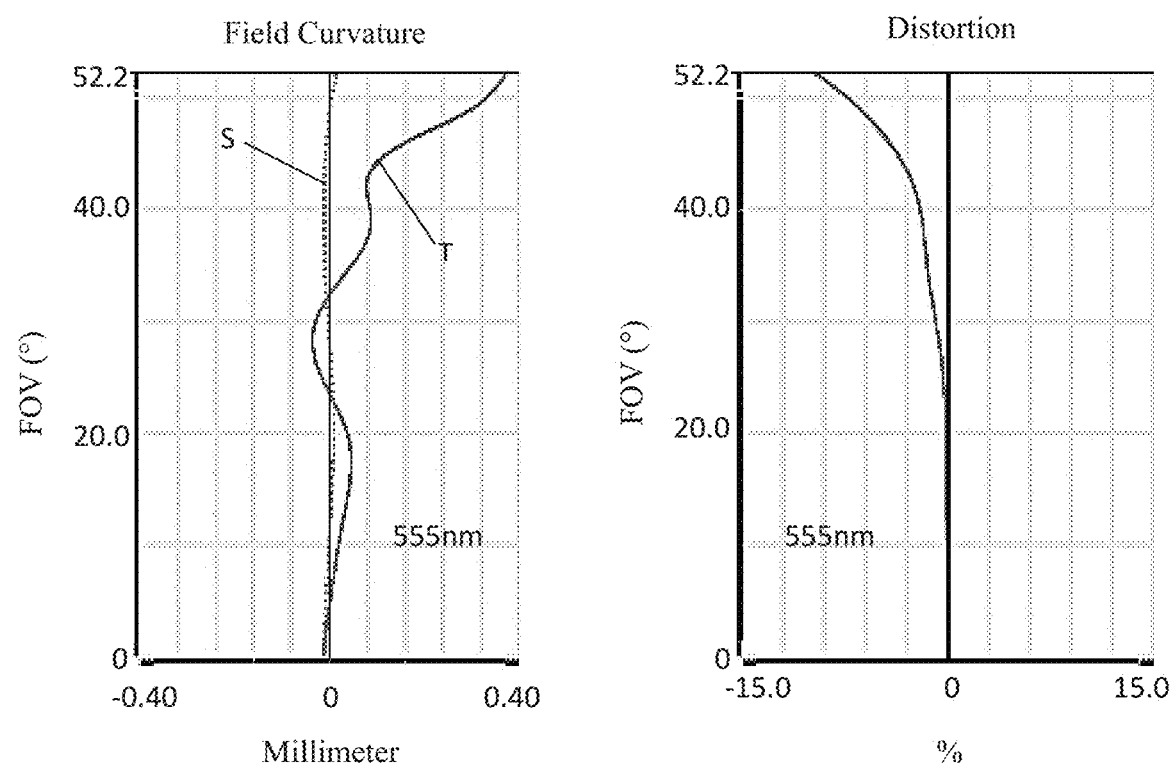
FIG. 4 is schematic diagrams of a field curvature and a distortion of the camera optical lens shown in FIG. 1.

FIG. 2 and FIG. 3 respectively show schematic diagrams of longitudinal aberration and lateral color of light with wavelengths of 650 nm, 610 nm, 555 nm, 510 nm, 470 nm, and 435 nm after passing through the camera optical lens 10. FIG. 4 shows a schematic diagram of field curvature and distortion of light with a wavelength of 555 nm after passing through the camera optical lens 10. The field curvature S in FIG. 4 is a field curvature in a sagittal direction, and T is a field curvature in a tangential direction.

In this embodiment, the camera optical lens 10 has an entrance pupil diameter ENPD of 0.795 mm, a full field-of-view image height IH of 2.285 mm, and a field of view FOV of 104.40° in a diagonal direction, so that the camera optical lens 10 meets design requirements of a large aperture, a wide angle, and ultra-thinness, has fully corrected on-axis and off-axis chromatic aberration, and has excellent optical characteristics.

Second Embodiment

Figure 5:
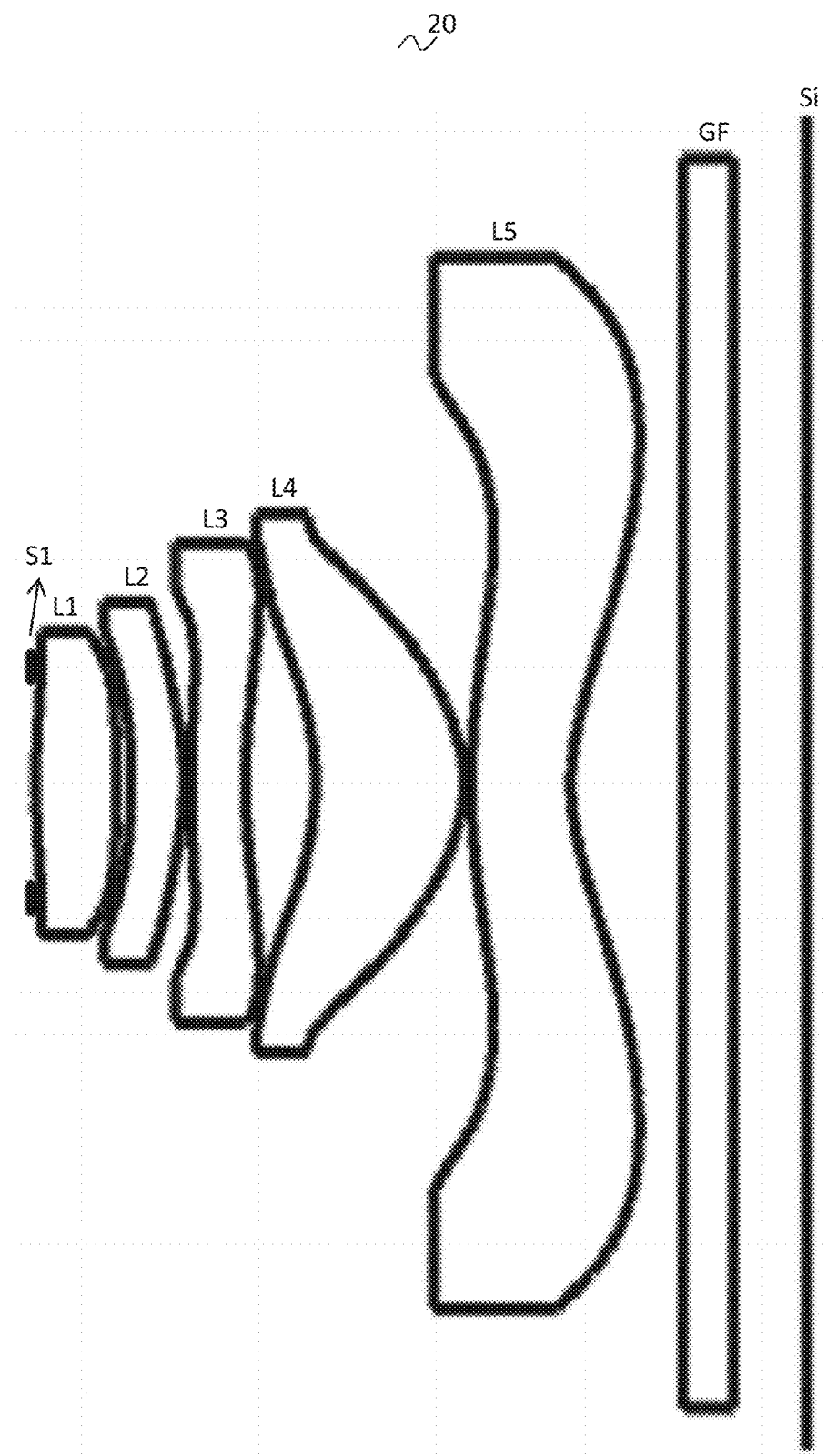
FIG. 5 is a schematic structural diagram of a camera optical lens according to a second embodiment of the present disclosure.

FIG. 5 is a schematic structural diagram of a camera optical lens 20 according to the second embodiment. The second embodiment is basically the same as the first embodiment. Symbols in the following list haves the same meanings as those in the first embodiment, so the same parts will not be repeated here, and only the differences therebetween will be listed below.

In this embodiment, the image side surface of the first lens L1 is a convex surface at the paraxial position.

In this embodiment, the third lens L3 has negative refractive power.

Table 5 and Table 6 show design data of the camera optical lens 20 according to the second embodiment of the present disclosure.

TABLE 5

| | R | d | | nd | | vd |
|---|---|---|---|---|---|---|
| S1 | ∞ | d0= | −0.008 | | | |
| R1 | 2.522 | d1= | 0.341 | nd1 | 1.5444 v1 | 55.82 |
| R2 | −8.600 | d2= | 0.064 | | | |
| R3 | −1.612 | d3= | 0.223 | nd2 | 1.5444 v2 | 55.82 |
| R4 | −0.854 | d4= | 0.030 | | | |
| R5 | 5.962 | d5= | 0.230 | nd3 | 1.6700 v3 | 19.39 |
| R6 | 1.869 | d6= | 0.296 | | | |
| R7 | −0.927 | d7= | 0.632 | nd4 | 1.5346 v4 | 55.69 |
| R8 | −0.470 | d8= | 0.031 | | | |
| R9 | 2.275 | d9= | 0.421 | nd5 | 1.6700 v5 | 19.39 |
| R10 | 0.632 | d10= | 0.478 | | | |
| R11 | ∞ | d11= | 0.210 | ndg | 1.5168 vg | 64.17 |
| R12 | ∞ | d12= | 0.314 | | | |

Table 6 shows aspheric data of respective lenses in the camera optical lens 20 according to the second embodiment of the present disclosure.

TABLE 6

| | Conic coefficient | Aspheric coefficient | | | | |
|---|---|---|---|---|---|---|
| | k | A4 | A6 | A8 | A10 | A12 |
| R1 | −1.4084E+01 | −2.6916E−01 | 4.6413E+00 | −1.7880E+02 | 3.4893E+03 | −4.1618E+04 |
| R2 | −8.2633E+01 | −6.5581E−01 | −5.4204E+00 | 5.7157E+01 | −7.1325E+02 | 6.9161E+03 |
| R3 | −1.1598E+01 | −3.1158E−01 | 4.2949E+00 | −1.6678E+02 | 2.4203E+03 | −1.9628E+04 |
| R4 | −1.9785E+01 | −8.6340E−01 | 1.2646E+02 | −1.9232E+02 | 1.8617E+03 | −1.0600E+04 |
| R5 | 5.0642E+01 | 1.3503E+00 | −1.8828E+01 | 1.2117E+02 | −5.2790E+02 | 1.4647E+03 |
| R6 | 8.8750E−01 | −5.2454E−01 | 2.5693E+00 | −2.0056E+01 | 9.3775E+01 | −2.7371E+02 |
| R7 | −1.4141E−01 | 7.4977E−02 | 9.9832E−01 | 1.4332E+00 | −1.4234E+01 | 3.6788E+01 |
| R8 | −3.1122E+00 | −1.0225E+00 | 4.3285E+00 | −2.1658E+01 | 7.7327E+01 | −1.8444E+02 |
| R9 | −7.0421E+01 | 5.6951E−01 | −2.0639E+00 | 3.9159E+00 | −4.9961E+00 | 4.2979E+00 |
| R10 | −7.4869E+00 | 1.2731E−01 | −5.2990E−01 | 7.8289E−01 | −7.0998E−01 | 4.1746E−01 |
| | Conic coefficient | Aspheric coefficient | | | | |
| | k | A14 | A16 | A18 | A20 | |
| R1 | −1.4084E+01 | 3.0411E+05 | −1.3213E+06 | 3.0993E+06 | −2.9788E+06 | |
| R2 | −8.2633E+01 | −4.3880E+04 | 1.6657E+05 | −3.4547E+05 | 3.0535E+05 | |
| R3 | −1.1598E+01 | 9.7642E+04 | −3.0094E+05 | 5.2856E+05 | −3.9997E+05 | |
| R4 | −1.9785E+01 | 3.6668E+04 | −7.7185E+04 | 9.1483E+04 | −4.6693E+04 | |
| R5 | 5.0642E+01 | −2.2371E+03 | 7.5695E+02 | 2.4470E+03 | −2.3856E+03 | |

TABLE 6-continued

| | | | | | |
|---|---|---|---|---|---|
| R6 | 8.8750E−01 | 5.0963E+02 | −5.9204E+02 | 3.9046E+02 | −1.1145E+02 |
| R7 | −1.4141E−01 | −1.8344E+01 | −7.5018E+01 | 1.2483E+02 | −5.6864E+01 |
| R8 | −3.1122E+00 | 2.8764E+02 | −2.8113E+02 | 1.5653E+02 | −3.7734E+01 |
| R9 | −7.0421E+01 | −2.4285E+00 | 8.5191E−01 | −1.6626E−01 | 1.3691E−02 |
| R10 | −7.4869E+00 | −1.5880E−01 | 3.7538E−02 | −5.0006E−03 | 2.8651E−04 |

Table 7 and Table 8 show design data of inflection points and arrest points of respective lenses in the camera optical lens 20.

TABLE 7

| | Number of reflection points | Reflection point position 1 | Reflection point position 2 |
|---|---|---|---|
| P1R1 | 1 | 0.285 | / |
| P1R2 | 1 | 0.515 | / |
| P2R1 | 2 | 0.505 | 0.565 |
| P2R2 | 1 | 0.585 | / |
| P3R1 | 2 | 0.275 | 0.655 |
| P3R2 | 1 | 0.385 | / |
| P4R1 | 2 | 0.505 | 0.825 |
| P4R2 | 1 | 0.785 | / |
| P5R1 | 2 | 0.515 | 1.355 |
| P5R2 | 2 | 0.515 | 1.865 |

TABLE 8

| | Number of arrest points | Arrest point position 1 |
|---|---|---|
| P1R1 | 1 | 0.425 |
| P1R2 | 0 | / |
| P2R1 | 0 | / |
| P2R2 | 0 | / |
| P3R1 | 1 | 0.415 |
| P3R2 | 1 | 0.665 |
| P4R1 | 0 | / |
| P4R2 | 1 | 0.955 |
| P5R1 | 1 | 0.875 |
| P5R2 | 1 | 1.245 |

In addition, Table 17 below also lists values corresponding to various parameters in the second embodiment and parameters specified in the relational expressions. Apparently, the camera optical lens in this embodiment satisfies the above relational expressions.

Figure 6:
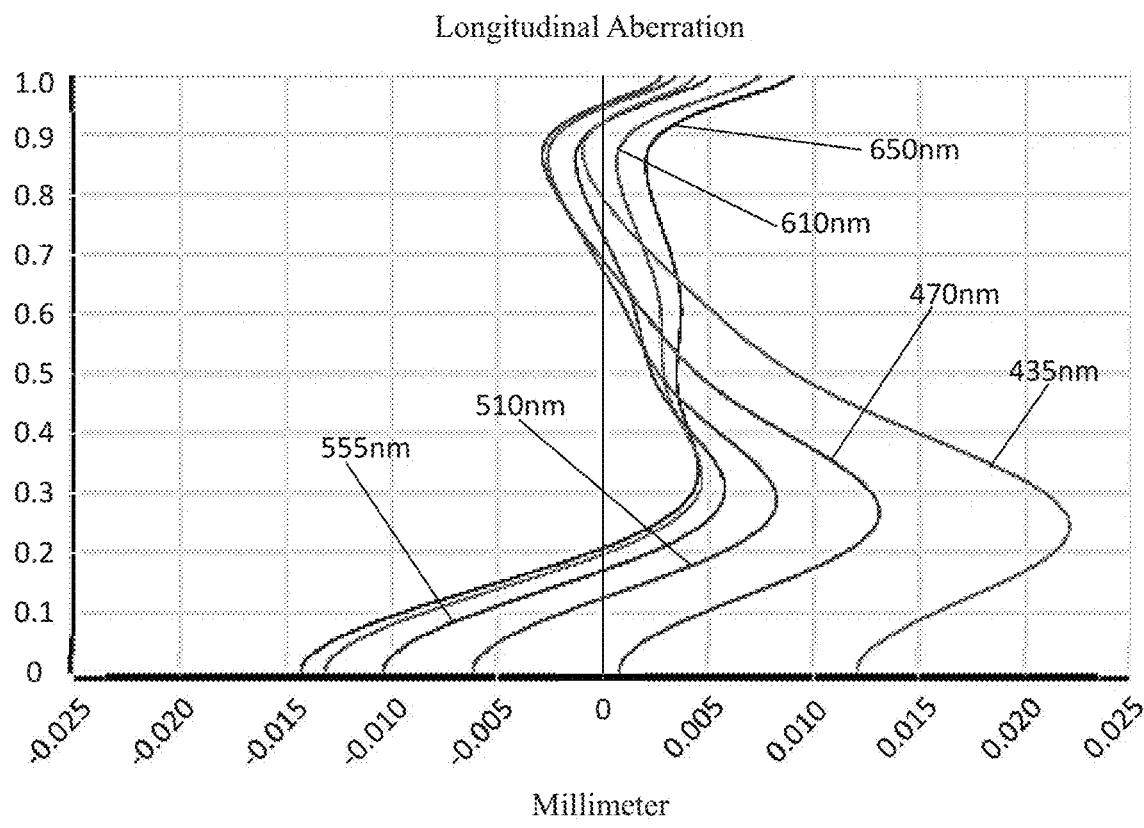
FIG. 6 is a schematic diagram of a longitudinal aberration of the camera optical lens shown in FIG. 5.
Figure 7:
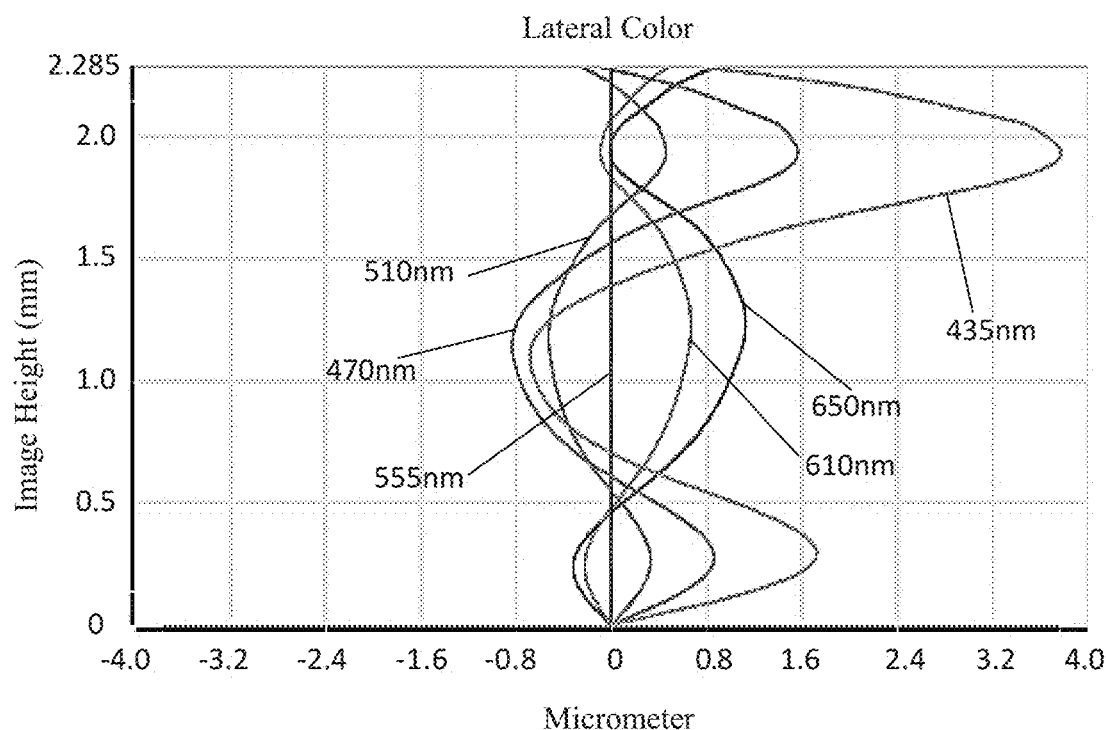
FIG. 7 is a schematic diagram of a lateral color of the camera optical lens shown in FIG. 5.
Figure 8:
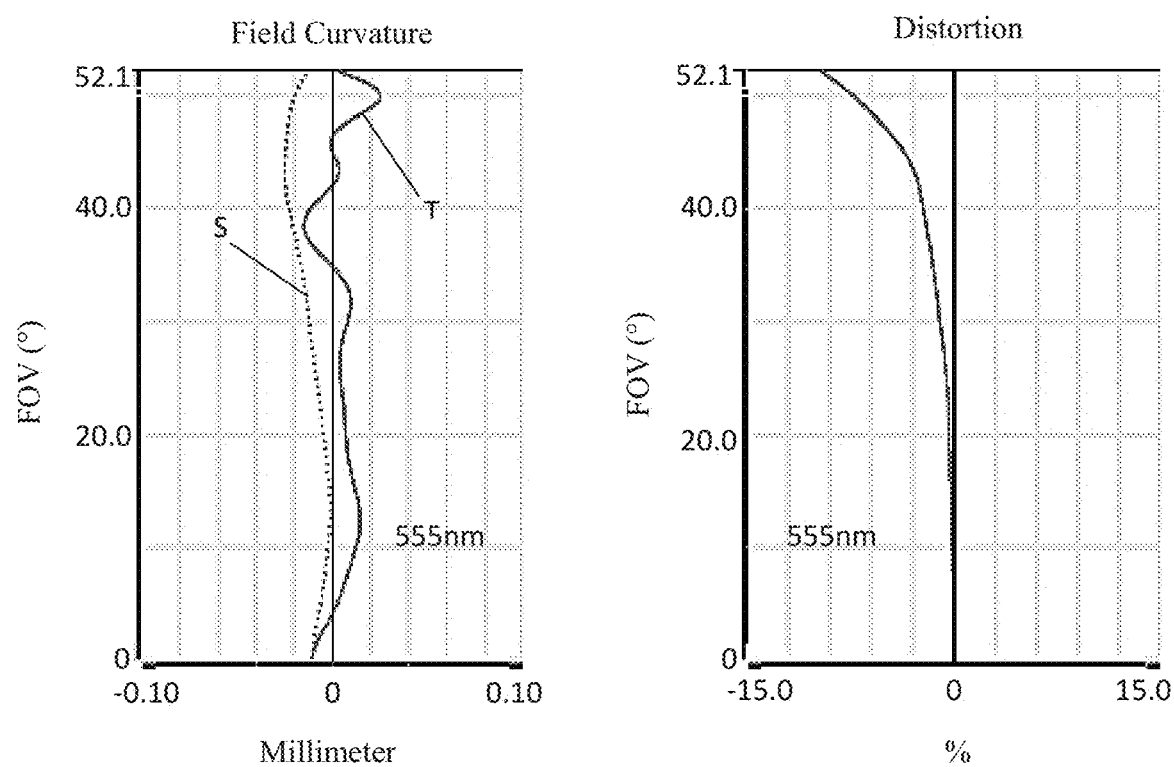
FIG. 8 is schematic diagrams of a field curvature and a distortion of the camera optical lens shown in FIG. 5.

FIG. 6 and FIG. 7 respectively show schematic diagrams of longitudinal aberration and lateral color of light with wavelengths of 650 nm, 610 nm, 555 nm, 510 nm, 470 nm, and 435 nm after passing through the camera optical lens 20. FIG. 8 shows a schematic diagram of field curvature and distortion of light with a wavelength of 555 nm after passing through the camera optical lens 20. The field curvature S in FIG. 8 is a field curvature in a sagittal direction, and T is field curvature in a tangential direction.

In this embodiment, the camera optical lens 20 has an entrance pupil diameter ENPD of 0.796 mm, a full field-of-view image height IH of 2.285 mm, and a field of view FOV of 104.20° in a diagonal direction, so that the camera optical lens 20 meets design requirements of a large aperture, a wide angle, and ultra-thinness, has fully corrected on-axis and off-axis chromatic aberration, and has excellent optical characteristics.

Third Embodiment

Figure 9:
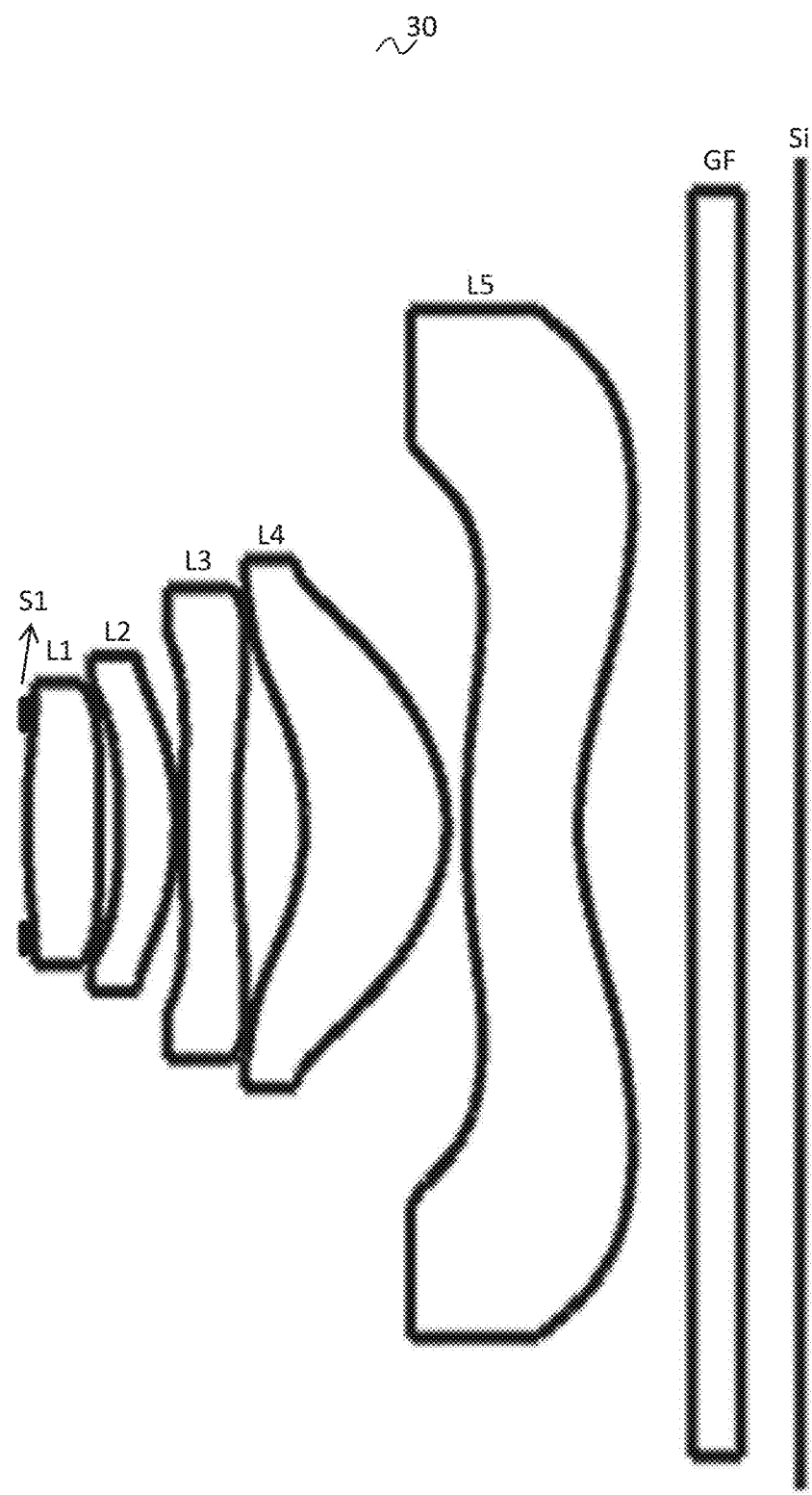
FIG. 9 is a schematic structural diagram of a camera optical lens according to a third embodiment of the present disclosure.

FIG. 9 is a schematic structural diagram of a camera optical lens 30 according to the third embodiment. The third embodiment is basically the same as the first embodiment. Symbols in the following list have the same meanings as those in the first embodiment, so the same parts will not be repeated here, and only differences therebetween will be listed below.

In this embodiment, the third lens L3 has negative refractive power.

Table 9 and Table 10 show design data of the camera optical lens 30 according to the third embodiment of the present disclosure.

TABLE 9

| | R | d | | nd | | vd | |
|---|---|---|---|---|---|---|---|
| S1 | ∞ | d0= | −0.015 | | | | |
| R1 | 2.124 | d1= | 0.304 | nd1 | 1.5444 | v1 | 55.82 |
| R2 | 11.024 | d2= | 0.088 | | | | |
| R3 | −2.060 | d3= | 0.238 | nd2 | 1.5444 | v2 | 55.82 |
| R4 | −1.040 | d4= | 0.030 | | | | |
| R5 | 3.005 | d5= | 0.230 | nd3 | 1.6700 | v3 | 19.39 |
| R6 | 2.237 | d6= | 0.286 | | | | |
| R7 | −0.865 | d7= | 0.605 | nd4 | 1.5346 | v4 | 55.69 |
| R8 | −0.540 | d8= | 0.083 | | | | |
| R9 | 3.488 | d9= | 0.477 | nd5 | 1.6700 | v5 | 19.39 |
| R10 | 0.969 | d10= | 0.478 | | | | |
| R11 | ∞ | d11= | 0.210 | ndg | 1.5168 | vg | 64.17 |
| R12 | ∞ | d12= | 0.250 | | | | |

Table 10 shows aspheric data of respective lenses in the camera optical lens 30 according to the third embodiment of the present disclosure.

TABLE 10

| | Conic coefficient | Aspheric coefficient | | | | |
|---|---|---|---|---|---|---|
| | k | A4 | A6 | A8 | A10 | A12 |
| R1 | −8.7725E+00 | −3.9781E−01 | 1.9884E+01 | −7.9884E+02 | 1.8043E+04 | −2.4957E+05 |
| R2 | −5.0926E+01 | −4.4269E−01 | −6.6365E+00 | 7.6844E+01 | −7.8671E+02 | 2.7931E+03 |
| R3 | 5.9328E−01 | −8.9221E−01 | 2.3633E+01 | −7.3921E+02 | 1.2252E+04 | −1.2674E+05 |
| R4 | −8.6742E+00 | −2.2277E+00 | 2.1669E+01 | −2.0659E+02 | 1.3854E+03 | −6.7334E+03 |

TABLE 10-continued

| | | | | | | |
|---|---|---|---|---|---|---|
| R5 | 1.3409E+01 | −1.8792E+00 | 1.9757E+01 | −1.9978E+02 | 1.3213E+03 | −5.8410E+03 |
| R6 | 1.8251E+00 | −8.3793E−01 | 4.3158E+00 | −2.3118E+01 | 8.3597E+01 | −1.9759E+02 |
| R7 | −2.1798E−01 | −3.1677E−01 | 4.8293E+00 | −3.1308E+01 | 1.6647E+02 | −5.3513E+02 |
| R8 | −2.6067E+00 | −6.7225E−01 | 3.7624E+00 | −3.0674E+01 | 1.3983E+02 | −3.8268E+02 |
| R9 | −9.8853E+01 | 7.3963E−01 | −3.0988E+00 | 6.4200E+00 | −8.4320E+00 | 7.0081E+00 |
| R10 | −7.6949E+00 | 1.9827E−01 | −8.6390E−01 | 1.3959E+00 | −1.3666E+00 | 8.5967E−01 |

| | Conic coefficient | Aspheric coefficient | | | |
|---|---|---|---|---|---|
| | k | A14 | A16 | A18 | A20 |
| R1 | −8.7725E+00 | 2.1435E+06 | −1.1154E+07 | 3.2191E+07 | −3.9536E+07 |
| R2 | −5.0926E+01 | 1.8423E+04 | −2.1260E+05 | 7.1719E+05 | −8.1251E+05 |
| R3 | 5.9328E−01 | 8.2895E+05 | −3.2929E+06 | 7.1754E+06 | −6.5237E+06 |
| R4 | −8.6742E+00 | 2.7293E+04 | −8.3059E+04 | 1.4756E+05 | −1.0822E+05 |
| R5 | 1.3409E+01 | 1.7226E+04 | −3.2460E+04 | 3.4986E+04 | −1.6214E+04 |
| R6 | 1.8251E+00 | 3.0719E+02 | −3.0827E+02 | 1.8058E+02 | −4.6659E+01 |
| R7 | −2.1798E−01 | 1.0524E+03 | −1.2587E+03 | 8.4212E+02 | −2.4116E+02 |
| R8 | −2.6067E+00 | 6.5241E+02 | −6.7614E+02 | 3.8881E+02 | −9.4779E+01 |
| R9 | −9.8853E+01 | −3.4856E+00 | 8.8957E−01 | −6.1328E−02 | −9.8967E−03 |
| R10 | −7.6949E+00 | −3.4692E−01 | 8.6386E−02 | −1.2058E−02 | 7.2105E−04 |

Table 11 and Table 12 show design data of inflection points and arrest points of respective lenses in the camera optical lens 30.

TABLE 11

| | Number of reflection points | Reflection point position 1 | Reflection point position 2 |
|---|---|---|---|
| P1R1 | 1 | 0.315 | / |
| P1R2 | 2 | 0.115 | 0.485 |
| P2R1 | 2 | 0.475 | 0.515 |
| P2R2 | 1 | 0.435 | / |
| P3R1 | 2 | 0.175 | 0.645 |
| P3R2 | 1 | 0.335 | / |
| P4R1 | 2 | 0.475 | 0.795 |
| P4R2 | 1 | 0.775 | / |
| P5R1 | 2 | 0.465 | 1.285 |
| P5R2 | 2 | 0.515 | 1.825 |

TABLE 12

| | Number of arrest points | Arrest point position 1 |
|---|---|---|
| P1R1 | 1 | 0.425 |
| P1R2 | 1 | 0.185 |
| P2R1 | 0 | / |
| P2R2 | 1 | 0.605 |
| P3R1 | 1 | 0.325 |
| P3R2 | 1 | 0.645 |
| P4R1 | 0 | / |
| P4R2 | 0 | / |
| P5R1 | 1 | 0.785 |
| P5R2 | 1 | 1.155 |

In addition, Table 17 below also lists values corresponding to various parameters in the third embodiment and parameters specified in the relational expressions. Apparently, the camera optical lens in this embodiment satisfies the above relational expressions.

Figure 10:
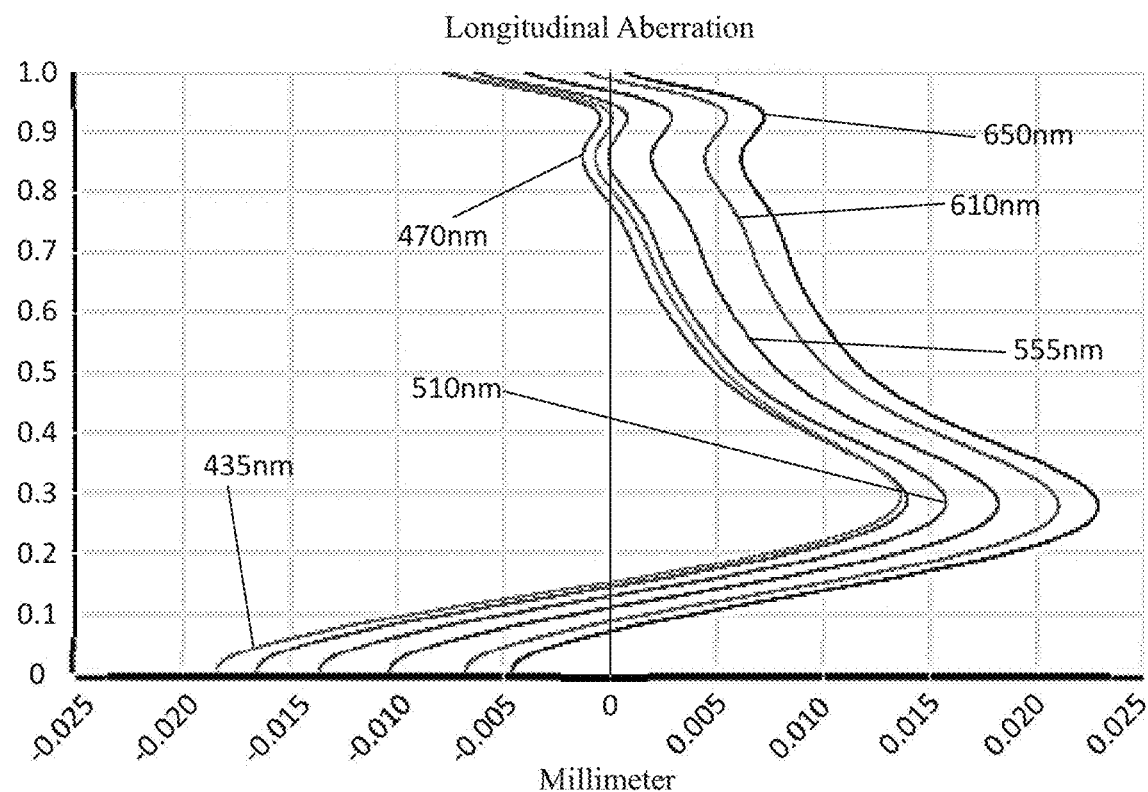
FIG. 10 is a schematic diagram of a longitudinal aberration of the camera optical lens shown in FIG. 9.
Figure 11:
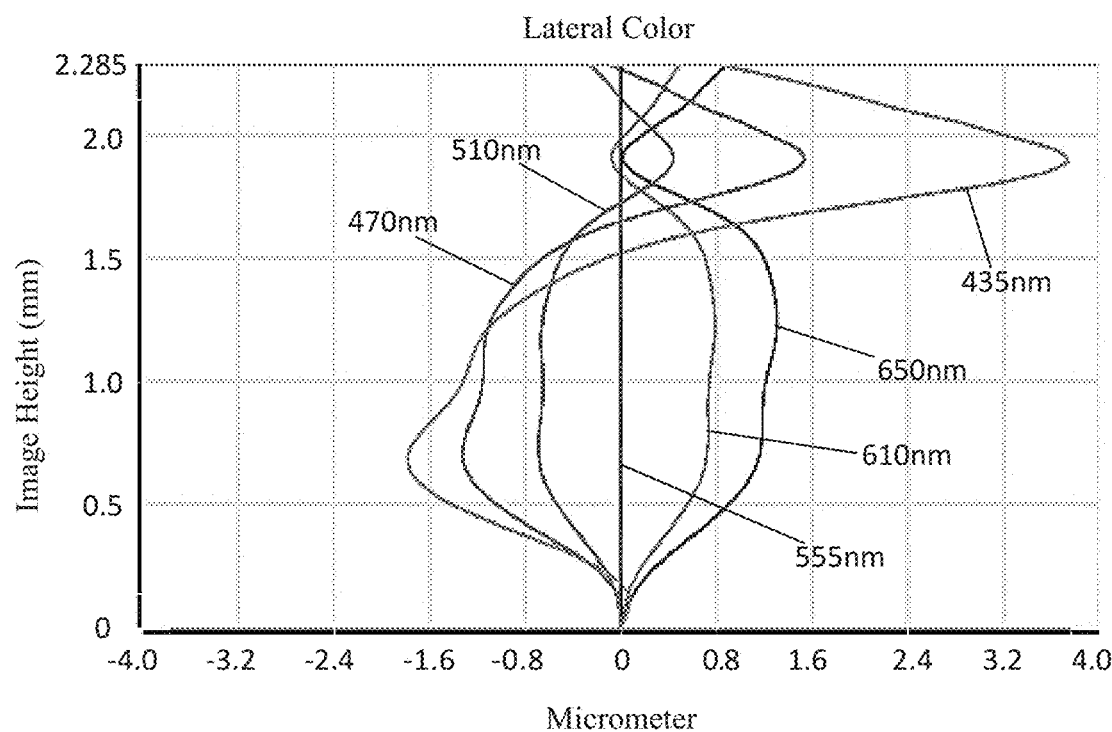
FIG. 11 is a schematic diagram of a lateral color of the camera optical lens shown in FIG. 9.
Figure 12:
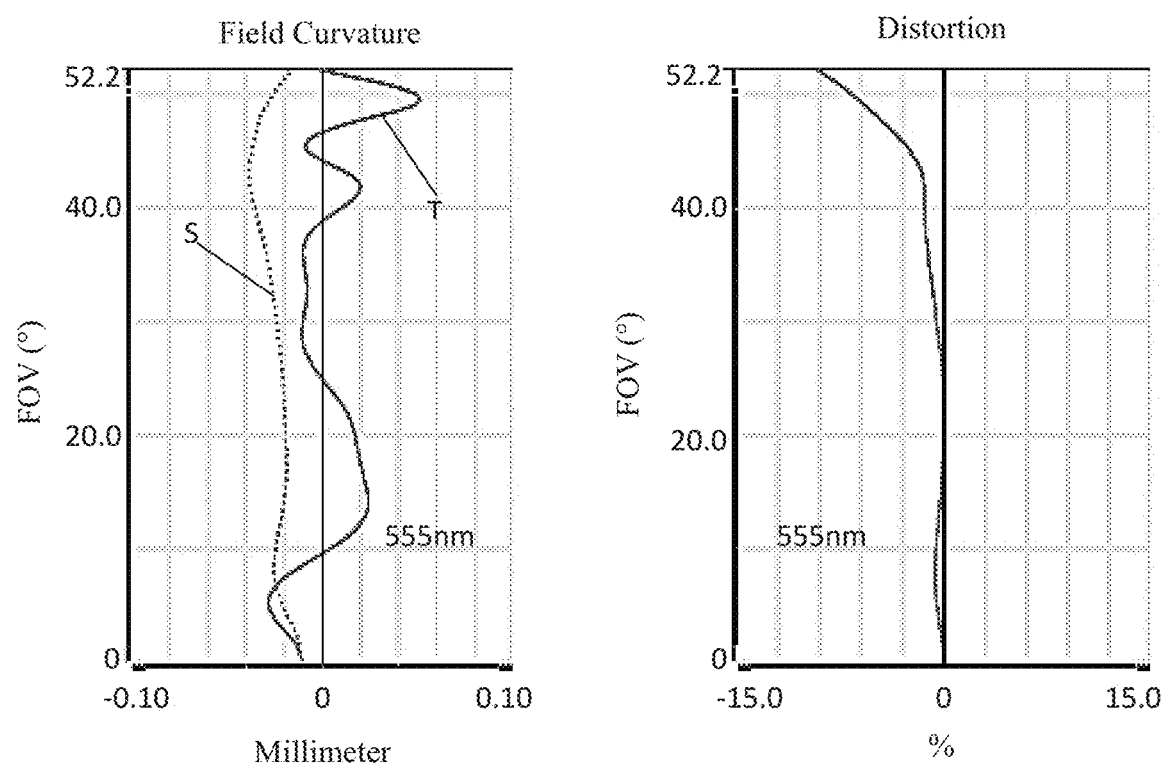
FIG. 12 is schematic diagrams of a field curvature and a distortion of the camera optical lens shown in FIG. 9.

FIG. 10 and FIG. 11 respectively show schematic diagrams of longitudinal aberration and lateral color of light with wavelengths of 650 nm, 610 nm, 555 nm, 510 nm, 470 nm, and 435 nm after passing through the camera optical lens 30. FIG. 12 shows a schematic diagram of a field curvature and a distortion of light with a wavelength of 555 nm after passing through the camera optical lens 30. The field curvature S in FIG. 12 is a field curvature in a sagittal direction, and T is a field curvature in a tangential direction.

In this embodiment, the camera optical lens 30 has an entrance pupil diameter ENPD of 0.792 mm, a full field-of-view image height IH of 2.285 mm, and a field of view FOV of 104.40° in a diagonal direction, so that the camera optical lens 30 meets design requirements of a large aperture, a wide angle, and ultra-thinness, has fully corrected on-axis and off-axis chromatic aberration, and has excellent optical characteristics.

Fourth Embodiment

Figure 13:
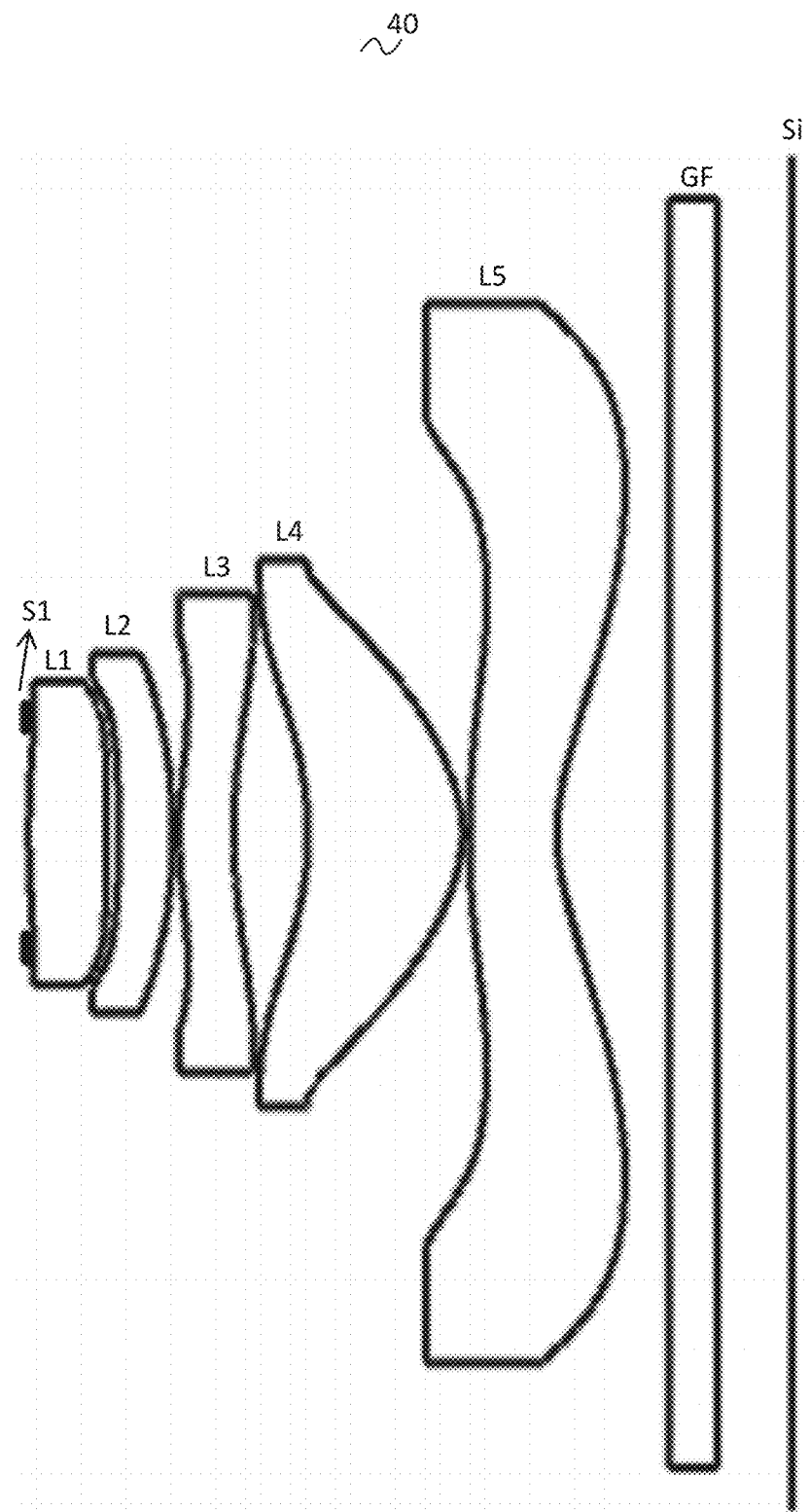
FIG. 13 is a schematic structural diagram of a camera optical lens according to a fourth embodiment of the present disclosure.

FIG. 13 is a schematic structural diagram of a camera optical lens 40 in the fourth embodiment. The fourth embodiment is basically the same as the first embodiment.

Table 13 shows design data of the camera optical lens 40 according to the fourth embodiment of the present disclosure.

TABLE 13

| | R | d | | nd | | vd | |
|---|---|---|---|---|---|---|---|
| S1 | ∞ | d0= | −0.009 | | | | |
| R1 | 2.693 | d1= | 0.328 | nd1 | 1.5444 | v1 | 55.82 |
| R2 | 9.394 | d2= | 0.057 | | | | |
| R3 | −4.036 | d3= | 0.229 | nd2 | 1.5444 | v2 | 55.82 |
| R4 | −3.687 | d4= | 0.031 | | | | |
| R5 | 1.128 | d5= | 0.232 | nd3 | 1.6700 | v3 | 19.39 |
| R6 | 1.568 | d6= | 0.318 | | | | |
| R7 | −0.992 | d7= | 0.662 | nd4 | 1.5346 | v4 | 55.69 |
| R8 | −0.390 | d8= | 0.031 | | | | |
| R9 | 3.847 | d9= | 0.372 | nd5 | 1.6700 | v5 | 19.39 |
| R10 | 0.520 | d10= | 0.478 | | | | |
| R11 | ∞ | d11= | 0.210 | ndg | 1.5168 | vg | 64.17 |
| R12 | ∞ | d12= | 0.315 | | | | |

Table 14 shows aspheric data of respective lenses in the camera optical lens 40 according to the fourth embodiment of the present disclosure.

TABLE 14

| | Conic coefficient | Aspheric coefficient | | | | |
|---|---|---|---|---|---|---|
| | k | A4 | A6 | A8 | A10 | A12 |
| R1 | −1.0044E+01 | −2.2912E−01 | 1.9018E+00 | −9.6662E+01 | 2.2392E+03 | −3.1642E+04 |
| R2 | 4.5885E+00 | −5.3329E−01 | −2.1119E+00 | −4.0354E+00 | 1.0398E+02 | −1.8174E+03 |
| R3 | 1.8271E+01 | −9.8568E−02 | 2.0501E+00 | −1.2816E+02 | 2.1237E+03 | −2.1112E+04 |
| R4 | 9.3926E+00 | −3.5371E+00 | 3.9755E+01 | −3.2863E+02 | 1.9317E+03 | −7.6388E+03 |
| R5 | −3.1601E+01 | −7.4977E−01 | 5.8419E+00 | −5.0952E+01 | 2.9371E+02 | −1.1653E+03 |
| R6 | −2.4299E−01 | −2.7152E−01 | −1.5208E+00 | 1.1421E+01 | −4.7593E+01 | 1.2648E+02 |
| R7 | −1.1629E−01 | 1.3651E−01 | 2.5741E+00 | −2.1250E+01 | 1.1002E+02 | −3.2659E+02 |
| R8 | −3.6457E+00 | −1.4717E+00 | 8.6665E+00 | −4.4652E+01 | 1.5305E+02 | −3.4630E+02 |
| R9 | −9.2204E+01 | 6.7687E−01 | −2.6475E+00 | 5.2217E+00 | −6.6435E+00 | 5.5889E+00 |
| R10 | −7.8912E+00 | 1.4977E−01 | −6.4611E−01 | 1.0031E+00 | −9.3485E−01 | 5.5653E−01 |
| | Conic coefficient | Aspheric coefficient | | | | |
| | k | A14 | A16 | A18 | A20 | |
| R1 | −1.0044E+01 | 2.7675E+05 | −1.4672E+06 | 4.3239E+06 | −5.4437E+06 | |
| R2 | 4.5885E+00 | 1.6676E+04 | −8.5689E+04 | 2.2371E+05 | −2.2602E+05 | |
| R3 | 1.8271E+01 | 1.2970E+05 | −4.8222E+05 | 9.8001E+05 | −8.2362E+05 | |
| R4 | 9.3926E+00 | 2.0087E+04 | −3.4746E+04 | 3.6388E+04 | −1.7283E+04 | |
| R5 | −3.1601E+01 | 3.1781E+03 | −5.6492E+03 | 5.7703E+03 | −2.5185E+03 | |
| R6 | −2.4299E−01 | −2.1249E+02 | 2.1460E+02 | −1.1646E+02 | 2.5046E+01 | |
| R7 | −1.1629E−01 | 5.8183E+02 | −6.2386E+02 | 3.7516E+02 | −9.8087E+01 | |
| R8 | −3.6457E+00 | 5.1336E+02 | −4.7716E+02 | 2.5112E+02 | −5.6791E+01 | |
| R9 | −9.2204E+01 | −3.0709E+00 | 1.0492E+00 | −2.0034E−01 | 1.6218E−02 | |
| R10 | −7.8912E+00 | −2.1276E−01 | 5.0411E−02 | −6.7295E−03 | 3.8662E−04 | |

Table 15 and Table 16 show design data of inflection points and arrest points of respective lenses in the camera optical lens 40.

TABLE 15

| | Number of reflection points | Reflection point position 1 | Reflection point position 2 |
|---|---|---|---|
| P1R1 | 1 | 0.295 | / |
| P1R2 | 1 | 0.125 | / |
| P2R1 | 1 | 0.515 | / |
| P2R2 | 1 | 0.605 | / |
| P3R1 | 2 | 0.235 | 0.695 |
| P3R2 | 1 | 0.425 | / |
| P4R1 | 2 | 0.495 | 0.835 |
| P4R2 | 1 | 0.785 | / |
| P5R1 | 2 | 0.495 | 1.355 |
| P5R2 | 2 | 0.475 | 1.855 |

TABLE 16

| | Number of arrest points | Arrest point position 1 |
|---|---|---|
| P1R1 | 1 | 0.425 |
| P1R2 | 1 | 0.205 |
| P2R1 | 0 | / |
| P2R2 | 0 | / |
| P3R1 | 1 | 0.485 |
| P3R2 | 1 | 0.775 |
| P4R1 | 0 | / |
| P4R2 | 0 | / |
| P5R1 | 1 | 0.845 |
| P5R2 | 1 | 1.225 |

In addition, Table 17 below also lists values corresponding to various parameters in the fourth embodiment and parameters specified in the relational expressions. Apparently, the camera optical lens in this embodiment satisfies the above relational expressions.

Figure 14:
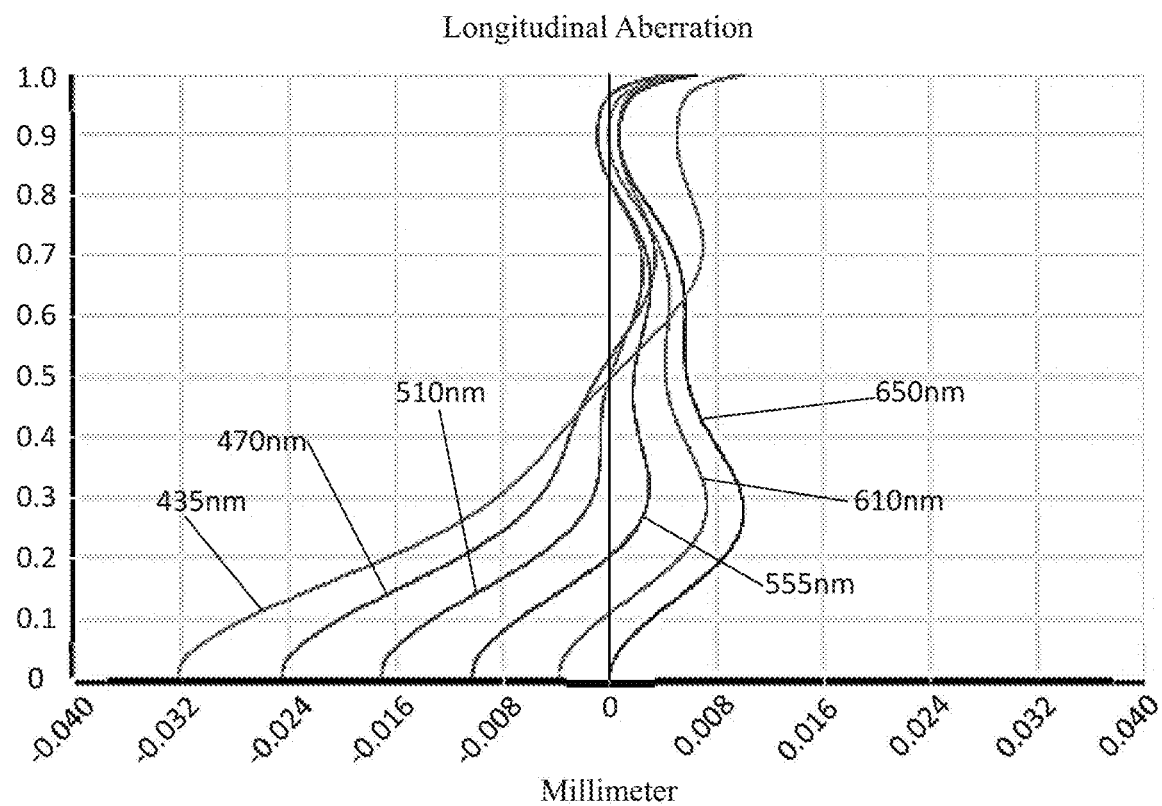
FIG. 14 is a schematic diagram of a longitudinal aberration of the camera optical lens shown in FIG. 13.
Figure 15:
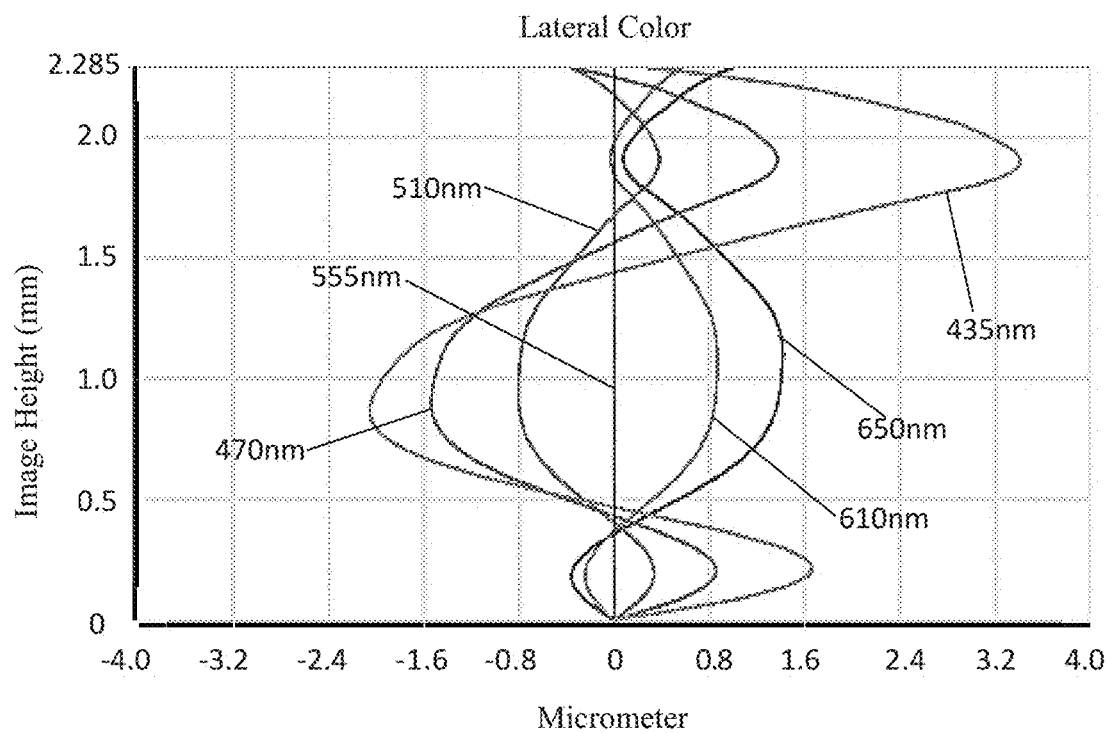
FIG. 15 is a schematic diagram of a lateral color of the camera optical lens shown in FIG. 13.
Figure 16:
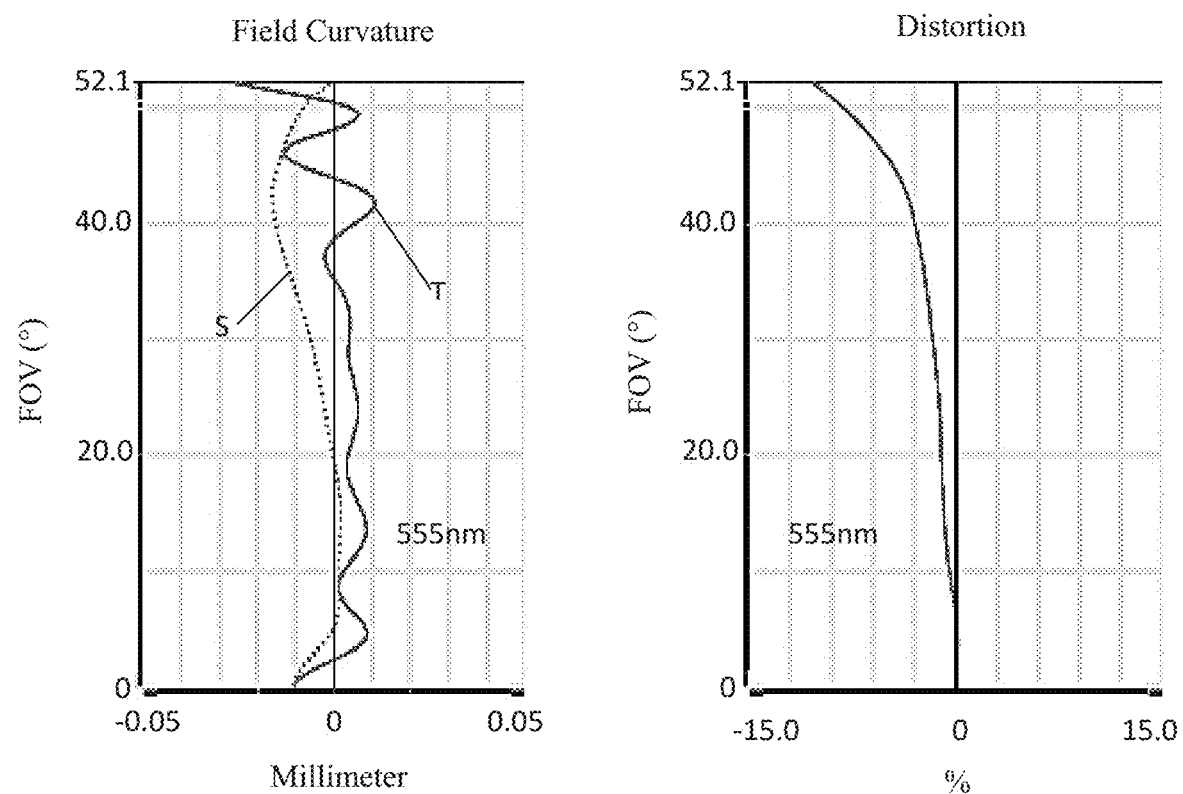
FIG. 16 is schematic diagrams of a field curvature and a distortion of the camera optical lens shown in FIG. 13.

FIG. 14 and FIG. 15 respectively show schematic diagrams of longitudinal aberration and lateral color of light with wavelengths of 650 nm, 610 nm, 555 nm, 510 nm, 470 nm, and 435 nm after passing through the camera optical lens 40. FIG. 16 shows a schematic diagram of field curvature and distortion of light with a wavelength of 555 nm after passing through the camera optical lens 40. The field curvature S in FIG. 16 is field curvature in a sagittal direction, and T is field curvature in a tangential direction.

In this embodiment, the camera optical lens 40 has an entrance pupil diameter ENPD of 0.802 mm, a full field-of-view image height IH of 2.285 mm, and a field of view FOV of 104.20° in a diagonal direction, so that the camera optical lens 40 meets design requirements of a large aperture, a wide angle, and ultra-thinness, has fully corrected on-axis and off-axis chromatic aberration, and has excellent optical characteristics.

Table 17 below lists values of corresponding relational expressions in the first embodiment, the second embodiment, the third embodiment, and the fourth embodiment, and values of other related parameters according to the above relational expressions.

TABLE 17

| Parameters and relational expressions | Embodiment 1 | Embodiment 2 | Embodiment 3 | Embodiment 4 |
|---|---|---|---|---|
| f1/f | 2.17 | 1.85 | 2.45 | 3.46 |
| d7/d9 | 1.60 | 1.50 | 1.27 | 1.78 |
| f4/f | 0.54 | 0.62 | 0.84 | 0.44 |
| R9/R10 | 5.35 | 3.60 | 3.60 | 7.40 |
| R3/R4 | 1.51 | 1.89 | 1.98 | 1.10 |
| f | 1.948 | 1.951 | 1.941 | 1.964 |
| f1 | 4.221 | 3.609 | 4.761 | 6.796 |
| f2 | 9.553 | 3.010 | 3.555 | 63.403 |
| f3 | 75.113 | −4.119 | −14.739 | 4.909 |
| f4 | 1.047 | 1.199 | 1.624 | 0.864 |
| f5 | −1.211 | −1.443 | −2.148 | −0.931 |
| f12 | 3.079 | 1.780 | 2.198 | 6.294 |
| FNO | 2.45 | 2.45 | 2.45 | 2.45 |
| TTL | 3.26 | 3.27 | 3.28 | 3.26 |
| IH | 2.29 | 2.29 | 2.29 | 2.29 |
| FOV | 104.40 | 104.20 | 104.40 | 104.20 |

The above are only the embodiments of the present disclosure. It should be pointed out here that for those of ordinary skill in the art, improvements can be made without departing from the inventive concept of the present disclosure, but these all belong to the protection scope of the present disclosure.

What is claimed is:

1. A camera optical lens, comprising from an object side to an image side:
   a first lens having positive refractive power;
   a second lens having positive refractive power;
   a third lens;
   a fourth lens having positive refractive power; and
   a fifth lens having negative refractive power;
   wherein the camera optical lens satisfies:

$1.80 \leq f1/f \leq 3.50$;

$1.25 \leq d7/d9 \leq 1.80$;

$0.40 \leq f4/f \leq 0.90$;

$3.50 \leq R9/R10 \leq 7.50$; and $1.00 \leq R3/R4 \leq 2.00$, where
   f denotes a total focal length of the camera optical lens,
   f1 denotes a focal length of the first lens,
   f4 denotes a focal length of the fourth lens,
   R3 denotes a curvature radius of an object side surface of the second lens,
   R4 denotes a curvature radius of an image side surface of the second lens,
   R9 denotes a curvature radius of an object side surface of the fifth lens,
   R10 denotes a curvature radius of an image side surface of the fifth lens,
   d7 denotes an on-axis thickness of the fourth lens, and
   d9 denotes an on-axis thickness of the fifth lens.

2. The camera optical lens as described in claim 1, further satisfying:

$1.80 \leq d2/d4 \leq 3.00$, where
   d2 denotes an on-axis distance from an image side surface of the first lens to an object side surface of the second lens, and
   d4 denotes an on-axis distance from an image side surface of the second lens to an object side surface of the third lens.

3. The camera optical lens as described in claim 1, further satisfying:

$-3.61 \leq (R1+R2)/(R1-R2) \leq -0.36$; and $0.05 \leq d1/TTL \leq 0.16$, where
   R1 denotes a curvature radius of an object side surface of the first lens,
   R2 denotes a curvature radius of an image side surface of the first lens,
   d1 denotes an on-axis thickness of the first lens, and
   TTL denotes a total optical length from the object side surface of the first lens to an image plane of the camera optical lens along an optic axis.

4. The camera optical lens as described in claim 1, further satisfying:

$0.77 \leq f2/f \leq 48.42$;

$1.52 \leq (R3+R4)/(R3-R4) \leq 33.19$; and $0.03 \leq d3/TTL \leq 0.11$, where
   f2 denotes a focal length of the second lens,
   d3 denotes an on-axis thickness of the second lens, and
   TTL denotes a total optical length from an object side surface of the first lens to an image plane of the camera optical lens along an optic axis.

5. The camera optical lens as described in claim 1, further satisfying:

$-15.19 \leq f3/f \leq 57.84$;

$-12.25 \leq (R5+R6)/(R5-R6) \leq 179.50$; and $0.04 \leq d5/TTL \leq 0.11$, where
   f3 denotes a focal length of the third lens,
   R5 denotes a curvature radius of an object side surface of the third lens, R6 denotes a curvature radius of an image side surface of the third lens, d5 denotes an on-axis thickness of the third lens, and TTL denotes a total optical length from an object side surface of the first lens to an image plane of the camera optical lens along an optic axis.

6. The camera optical lens as described in claim 1, further satisfying:

$1.15 \leq (R7+R8)/(R7-R8) \leq 6.48$; and $0.09 \leq d7/TTL \leq 0.31$, where

R7 denotes a curvature radius of an object side surface of the fourth lens,

R8 denotes a curvature radius of an image side surface of the fourth lens, d7 denotes an on-axis thickness of the fourth lens, and TTL denotes a total optical length from an object side surface of the first lens to an image plane of the camera optical lens along an optic axis.

7. The camera optical lens as described in claim 1, further satisfying:

$-2.21 \leq f5/f \leq -0.32$;

$0.66 \leq (R9+R10)/(R9-R10) \leq 2.65$; and $0.06 \leq d9/TTL \leq 0.22$, where f5 denotes a focal length of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying:

$TTL/IH \leq 1.45$, where

IH denotes an image height of the camera optical lens, and

TTL denotes a total optical length from an object side surface of the first lens to an image plane of the camera optical lens along an optic axis.

9. The camera optical lens as described in claim 1, further satisfying:

$FOV \geq 104.00°$, where FOV denotes a field of view of the camera optical lens.

10. The camera optical lens as described in claim 1, further satisfying:

$FNO \leq 2.46$, where FNO denotes an F number of the camera optical lens.

\* \* \* \* \*